(12) United States Patent
Mukai et al.

(10) Patent No.: US 8,722,298 B2
(45) Date of Patent: May 13, 2014

(54) RESIN PARTICLE

(75) Inventors: Takao Mukai, Kyoto (JP); Tsuyoshi Izumi, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 1029 days.

(21) Appl. No.: 11/997,746

(22) PCT Filed: Aug. 2, 2006

(86) PCT No.: PCT/JP2006/315299
§ 371 (c)(1),
(2), (4) Date: May 13, 2010

(87) PCT Pub. No.: WO2007/015516
PCT Pub. Date: Feb. 8, 2007

(65) Prior Publication Data
US 2010/0221655 A1 Sep. 2, 2010

(30) Foreign Application Priority Data

Aug. 3, 2005 (JP) .................................. 2005-226004

(51) Int. Cl.
*B32B 5/16* (2006.01)
*B05D 7/00* (2006.01)

(52) U.S. Cl.
USPC .................... 430/110.2; 428/407; 252/408.1; 427/213.3

(58) Field of Classification Search
USPC ............... 428/407, 403; 427/212, 213.3, 222, 427/384; 430/110.2; 252/408.1
See application file for complete search history.

(56) References Cited

U.S. PATENT DOCUMENTS

| 7,862,896 B2* | 1/2011 | Akutagawa et al. .......... 428/407 |
| 2003/0125479 A1 | 7/2003 | Kinsho et al. |
| 2005/0031871 A1 | 2/2005 | Kinsho et al. |

FOREIGN PATENT DOCUMENTS

| JP | 2002-014491 | 1/2002 |
| JP | 2002-148868 | 5/2002 |
| JP | 2002-174925 | 6/2002 |
| JP | 2002-284881 | 10/2002 |
| JP | 2004-143418 | 5/2004 |
| JP | 2004-226572 | 8/2004 |
| WO | WO03/037964 | 5/2003 |

OTHER PUBLICATIONS

International Search Report and Written Opinion mailed Oct. 3, 2006, in corresponding PCT Patent Application No. PCT/JP2006/315299.

* cited by examiner

*Primary Examiner* — Robert D. Harlan
(74) *Attorney, Agent, or Firm* — Edwards Wildman Palmer LLP

(57) ABSTRACT

To provide resin particles which are excellent in electrostatic properties, thermal resistance storage stability, and thermal properties and have uniform particle diameter. The invention is the resin particles (D) having a structure formed by depositing resin particles (A) comprising a first resin (a) having an initial softening temperature of 40 to 270° C., a glass transition temperature of 20 to 250° C., a flow temperature of 60 to 300° C., and difference of the glass transition temperature and the flow temperature in a range of 0 to 120° C. or a film (P) comprising the resin (a) on the surfaces of resin particles (B) comprising a second resin (b), wherein the surface coverage of the resin particles (B) with the resin particles (A) or the film (P) is 0.1 to 4.9%.

18 Claims, 1 Drawing Sheet

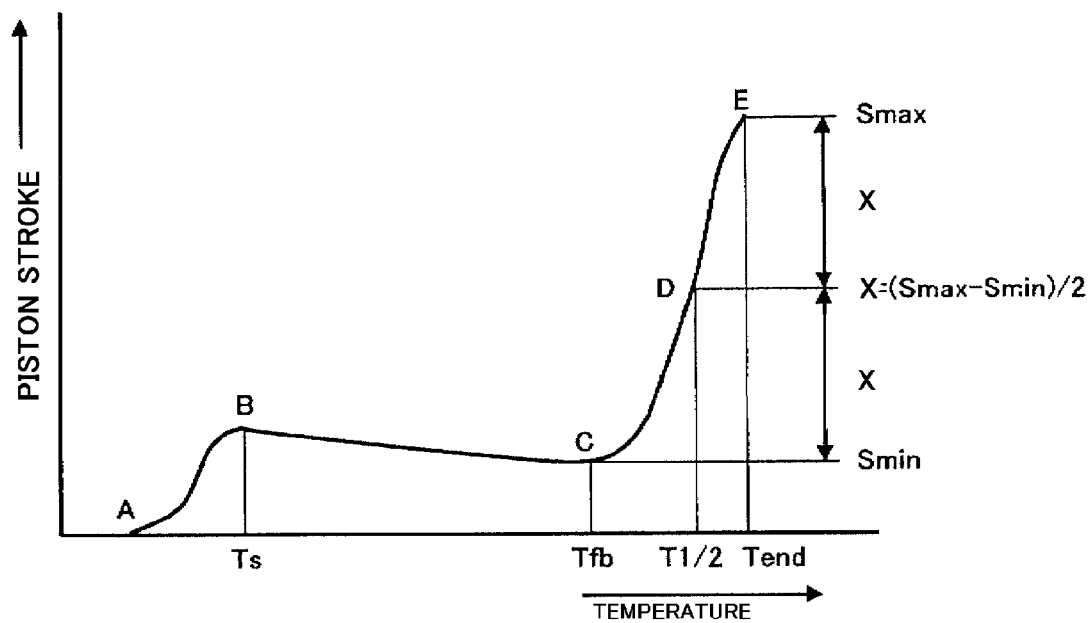

RESIN PARTICLE

CROSS-REFERENCE TO RELATED APPLICATIONS

This application is the 35 U.S.C. §371 national stage of PCT application PCT/JP2006/315299, filed Aug. 2, 2006, which claims priority to Japanese patent application No. 2005-226004, filed Aug. 3, 2005. The contents of these applications are incorporated herein by reference in their entirety.

FIELD OF THE INVENTION

The invention relates to resin particles. More particularly, the invention relates to resin particles useful for various applications such as powder coatings, electrophotographic toners, electrostatic recording toners, or the like.

BACKGROUND ART

As resin particles having even particle diameters and excellent in electric properties, thermal properties, and chemical stability have been known resin particles obtained using polymer fine particles as a dispersion stabilizer (reference to Patent Document 1).
Patent Document 1: Japanese Patent Application Laid-Open (JP-A) No. 2002-284881

DISCLOSURE OF THE INVENTION

Problems to be Solved by the Invention

However, in this method of using polymer fine particles as a dispersion stabilizer, although the polymer fine particles adhering to the surfaces of resin particles are removed by separation and/or dissolution, the particles cannot be removed sufficiently but remain on the resin surfaces and come interfering substances for fixing and electrostatic charging. Further, if the removal step is strengthened, since the surfaces of the resin particles are deteriorated, it sometimes results in deterioration of fixing and electrostatic charging. In the case of resin particles obtained in this manner, the resin particles have not necessarily sufficiently exhibited the advantageous properties of the main resins (e.g. electrostatic properties, thermal resistant storage stability, and low temperature fixing properties) for powder coatings and toners to be used for electrophotography, electrostatic recording, electrostatic printing, or the like.

Under the above-mentioned situation of the prior techniques, the invention has been accomplished. That is, the invention aims to provide resin particles having even particle diameters and excellent in electrostatic properties, thermal resistant storage stability, and thermal properties.

Means for Solving the Problems

The inventors of the invention have made investigations for solving the above-mentioned problems and accordingly have completed the invention.

That is, the invention provides (I) resin particles (D) having a structure formed by depositing resin particles (A) comprising a first resin (a) having an initial softening temperature of 40 to 270° C., a glass transition temperature of 20 to 250° C., a flow temperature of 60 to 300° C., and difference of the glass transition temperature and the flow temperature in a range of 0 to 120° C. or a film (P) comprising the resin (a) on the surfaces of resin particles (B) comprising a second resin (b), wherein the surface coverage of the resin particles (B) with the resin particles (A) or the film (P) is 0.1 to 4.9%; and (II) a method for producing resin particles by mixing a water-based dispersion (W) of resin particles (A) comprising a first resin (a) having an initial softening temperature of 40 to 270° C., a glass transition temperature of 20 to 250° C., a flow temperature of 60 to 300° C., and difference of the glass transition temperature and the flow temperature in a range of 0 to 120° C. with a second resin (b) or its solvent solution (O1), alternatively a precursor (b0) of the resin (b) or its solvent solution (O2) and dispersing (O1) or (O2) in (W), further causing reaction of (b0) in the case of using (b0) or its solvent solution and thereby forming resin particles (B) comprising (b) in (W); obtaining a water-based dispersion of resin particles (C) having a structure formed by depositing the resin particles (A) or a film (P) comprising the resin (a) on the surface of the resin particles (B); further obtaining a water-based dispersion of resin particles (D) by removing a portion of the resin particles (A) or the film (P) on the surfaces of (C) by separation and/or dissolution; and finally removing the aqueous medium from the water-based dispersion.

Effects of the Invention

The resin particles of the invention have the following effects.
1. Excellent in thermal properties and electrostatic properties and having a uniform particle diameter.
2. Excellent in thermal resistant storage stability and powder flowability.
3. Produced at a low cost since being resin particles obtainable by dispersion in water.
4. Having good mechanical physical properties of heated and melted coatings.

BRIEF DESCRIPTION OF THE DRAWINGS

FIG. 1 is a schematic diagram showing a flow chart of flow tester measurement of resin particles.

BEST MODE FOR CARRYING OUT THE INVENTION

In this invention, the first resin (a) may be selected from resins which have the above-mentioned initial softening temperature, glass transition temperature, flow temperature, and difference of the glass transition temperature and flow temperature, and can form a water-based dispersion (W). Any resin may be used if it satisfies the above-mentioned matter and thermoplastic or thermosetting resin may be used.

Examples of (a) may include vinyl resins, polyurethane resins, epoxy resins, polyester resins, polyamide resins, polyimide resins, silicone resins, phenol resins, melamine resins, urea resins, aniline resins, ionomer resins, and polycarbonate resins. Two or more of the above-mentioned resins may be used in combination as the resin (a). From a viewpoint that it is easy to obtain a water-based dispersion of fine spherical resin particles, preferable examples are vinyl resins, polyester resins, polyurethane resins, epoxy resins, and combinations of these resins and more preferable examples are vinyl resins.

The glass transition temperature (Tg), initial softening temperature (Ts), and flow temperature (T1/2) of the resin (a) can be easily adjusted by changing the molecular weight of (a) and/or the monomer composition composing (a). A method for adjusting the molecular weight of (a) (as the molecular weight is increased, these temperatures become higher) may include conventional methods and for instance, in the case that polymerization is carried out by consecutive reaction such as for polyurethane resins and polyester resins, adjusting the ratios of loading monomers can be included, and in the case that polymerization is carried out by chain reaction such as for vinyl resins, adjusting an amount of polymerization initiator and an amount of chain transferring agent, reaction temperature, and reaction concentration can be included. To adjust the difference of the glass transition temperature (Tg) and flow temperature (T1/2) within a preferable range, combination of the molecular weight of (a) and monomer composition composing (a) may be properly selected.

In the invention, to obtain a water-based dispersion of the fine spherical resin particles (A), it is preferable for the resin (a) to contain carboxyl groups. At least some of carboxyl groups may be neutralized with a basic group. The neutralization ratio of the carboxyl groups with a basic group is preferably 20 to 100% by equivalent and more preferably 40 to 100% by equivalent.

The content of the carboxyl groups (in the case the groups are neutralized with a basic group, the content calculated by conversion into carboxyl group (—COOH)) is preferably 1 to 50% based on the weight of (a). The lower limit is more preferably 1%, even more preferably 5% and most preferably 10%, and the upper limit is more preferably 45%, even more preferably 40%, and most preferably 35%. In the description above and below, % means % by weight unless otherwise specified.

If the neutralization ratio with a basic group and the carboxyl group-content are equal to or more than the lower limits of the above-mentioned ranges, the resin (a) tends to be dispersed easily in an aqueous medium to obtain a water-based dispersion (W) of fine spherical resin particles (A). Further, electrostatic properties of polyolefin resins (D) to be obtained can be improved.

The above-mentioned basic group for forming a neutralizing salt may be ammonia, monoamines having 1 to 30 carbon atom(s), polyamines (16) described somewhere below, quaternary ammoniums, alkali metals (sodium, potassium, or the like), alkaline earth metals (calcium salt, magnesium salt, or the like).

Examples of the monoamines having 1 to 30 carbon atom(s) include primary and/or secondary amines having 1 to 30 carbon atom(s) (ethylamine, n-butylamine, and isobutylamine) and tertiary amines having 3 to 30 carbon atoms (trimethylamine, triethylamine, and lauryldimethylamine). Examples of quaternary ammoniums are trialkylammonium having 4 to 30 carbon atoms (lauryltrimethylammonium).

Among them, alkali metals, quaternary ammoniums, monoamines, and polyamines are preferable; sodium, and monoamines having 1 to 20 carbon atom(s) are more preferable; and monoamines having 3 to 20 carbon atoms are even more preferable.

The number of carbon atoms of monomers having carboxyl groups or their salts for forming the vinyl resins and polyester resins is preferably 3 to 30, more preferably 3 to 15, and even more preferably 3 to 8.

In the production method of the second invention, to obtain the water-based dispersion (W) of the fine spherical resin particles (A) and obtain a water-based dispersion of resin particles (C) excellent in thermal resistant storage stability and electrostatic properties, and having an even particle diameter, the resin (a) preferably contains sulfonic acid anion group ($-SO_3^-$). The total content of the sulfonic acid anion group ($-SO_3^-$) is preferably 0.001 to 10% based on the weight of (a). The lower limit is more preferably 0.002% and the upper limit is more preferably 5%, even more preferably 2%, and most preferably 1%. The number of carbon atoms of a monomer containing the sulfonic acid anion group ($-SO_3^-$) for forming the resin is preferably 3 to 50, more preferably 3 to 30, and even more preferably 4 to 15.

If the content of the sulfonic acid anion group ($-SO_3^-$) is equal to or more than the lower limit of the above-mentioned range or the number of carbon atoms of the monomer containing the sulfonic acid anion group ($-SO_3^-$) for forming the resin is equal to or less than the upper limit of the above-mentioned range, the resin (a) is easy to be dispersed in an aqueous medium and it can be easy to obtain the water-based dispersion (W) of the fine spherical resin particles (A). Further, the anti-blocking properties and electrostatic properties of resin particles (D) to be obtained can be improved.

Hereinafter, vinyl resins, polyester resins, polyurethane resins, and epoxy resins, which are preferable resins for (a), will be described more in detail.

Vinyl resins are polymers obtained by homopolymerization or copolymerization of vinyl monomers. Examples of the vinyl monomers may include the following (1) to (10).

(1) Vinyl Hydrocarbons:

(1-1) Aliphatic vinyl hydrocarbons: alkenes such as ethylene, propylene, butene, isobutylene, pentene, heptene, diisobutylene, octene, dodecene, octadecene, and α-olefins other than these alkenes; alkadienes such as butadiene, isoprene, 1,4-pentadiene, 1,6-hexadiene, and 1,7-octadiene.

(1-2) Alicyclic vinyl hydrocarbons: mono- or di-cycloalkenes and alkadienes such as cyclohexene, (di)cyclopentadiene, vinylcyclohexene, and ethylidenebicycloheptene; terpenes such as pinene, limonene, and indene.

(1-3) Aromatic vinyl hydrocarbons: styrene and its hydrocarbyl (alkyl, cycloalkyl, aralkyl and/or alkenyl) substituted compounds such as α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene; and vinylnaphthalene.

(2) Carboxyl Group-Containing Vinyl Monomers and their Metal Salts:

Unsaturated monocarboxylic acids having 3 to 30 carbon atoms, unsaturated dicarboxylic acids, and their anhydrides and their monoalkyl (1 to 24 carbon atom(s)) esters, for example, carboxyl group-containing monomers such as (meth) acrylic acid, maleic acid (anhydride), maleic acid monoalkyl esters, fumaric acid, fumaric acid monoalkyl esters, crotonic acid, itaconic acid, itaconic acid monoalkyl esters, itaconic acid glycol monoether, citraconic acid, citraconic acid monoalkyl esters, and cinnamic acid. The above-mentioned (meth)acrylic acid means acrylic acid and/or methacrylic acid and hereinafter the same term is employed.

(3) Sulfone group-containing vinyl monomers, vinyl sulfuric acid monoester compounds, and their salts: Alkenesulfonic acids having 2 to 14 carbon atoms such as vinylsulfonic acid, (meth)allylsulfonic acid, methylvinylsulfonic acid, and styrenesulfonic acid; and their alkyl derivatives having 2 to 24 carbon atoms such as α-methylstyenesulfonic acid; sulfo(hydroxy)alkyl (meth)acrylate or (meth)acrylamide, e.g. sulfopropyl (meth)acrylate, 2-hydroxy-3-(meth)acryloxypropylsulfonic acid, 2-(meth)acryloylamino-2,2-dimethylethanesulfonic acid, 2-(meth)acryloyloxyethanesulfonic acid, 3-(meth)acryloyloxy-2-hydroxypropanesulfonic acid, 2-(meth)acrylamide-2-methylpropanesulfonic acid, 3-(meth) acrylamide-2-hydroxypropanesulfonic acid, alkyl (3 to 18 carbon atoms) allylsulfosuccinic acid, poly(n=2 to 30)oxyalkylene (ethylene, propylene, butylene: may be solo, random, or block) mono (meth)acrylate sulfuric acid esters (e.g. poly (n=5 to 15)oxypropylene monomethacrylate sulfuric acid ester), polyoxyethylene polycyclic phenyl ether sulfuric acid esters, and sulfuric acid or sulfonic acid group-containing monomer esters defined by the following formulas (1-1) to (1-3), and their salts.

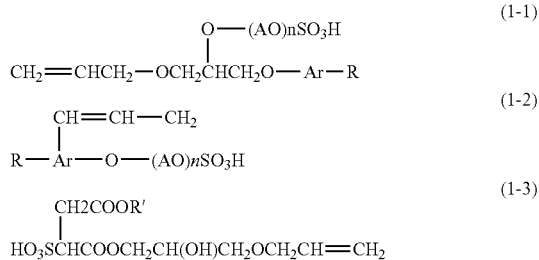

(wherein, R denotes an alkyl group having 1 to 15 carbon atom (s); A denotes alkylene groups having 2 to 4 carbon atoms and may be same or different in the case n is a plural number, and the alkylene groups may be random or block type in the case they are different; Ar denotes a benzene ring; n denotes an integer of 1 to 50; and R' denotes an alkyl group having 1 to 15 carbon atom(s) and optionally substituted with fluorine atom).

(4) Phosphoric Acid Group-Containing Vinyl Monomers and their Salts:

(Meth)acryloyloxyalkyl(C1 to C24) phosphoric acid monoesters such as 2-hydroxyethyl(meth)acryloyl phosphate and phenyl-2-acryloyloxyethyl phosphate; and (meth)acryloyloxyalkyl(C1 to C24) phosphonic acids such as 2-acryloyloxyethylphosphonic acid.

Examples of salts of the above-mentioned (2) to (4) are metal salts, ammonium salts, and amine salts (including quaternary ammonium salts). Examples of the metals forming the metal salts include Al, Ti, Cr, Mn, Fe, Zn, Ba, Zr, Ca, Mg, Na, and K.

Alkali metal salts and amine salts are preferable and sodium salts and tertiary monoamine salts having 3 to 20 carbon atoms are more preferable.

(5) Hydroxyl Group-Containing Vinyl Monomers:

Hydroxystyrene, N-methylol (meth) acrylamide, hydroxyethyl (meth)acrylate, hydroxypropyl (meth)acrylate, polyethylene glycol mono (meth)acrylate, (meth)allyl alcohol, crotyl alcohol, isocrotyl alcohol, 1-buten-3-ol, 2-buten-1-ol, 2-buten-1,4-diol, propargyl alcohol, 2-hydroxyethylpropenyl ether, and sucrose allyl ether.

(6) Nitrogen-Containing Vinyl Monomers:

(6-1) Amino group-containing vinyl monomers: aminoethyl (meth)acrylate, dimethylaminoethyl (meth)acrylate, diethylaminoethyl (meth)acrylate, tert-butylaminoethyl methacrylate, N-aminoethyl (meth) acrylamide, (meth)allylamine, morpholinoethyl (meth)acrylate, 4-vinylpyridine, 2-vinylpyridine, crotylamine, N,N-dimethylaminostyrene, methyl α-acetoaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, aminomercaptothiazole, and their salts.

(6-2) Amido group-containing vinyl monomers: (meth) acrylamide, N-methyl(meth)acrylamide, N-butylacrylamide, diacetoneacrylamide, N-methylol(meth)acrylamide, N,N'-methylene-bis(meth)acrylamide, cinnamic acid amide, N,N-dimethylacrylamide, N,N-dibenzylacrylamide, methacrylformamide, N-methyl-N-vinylacetamide, and N-vinylpyrrolidone.

(6-3) Nitrile group-containing vinyl monomers: (meth) acrylonitrile, cyanostyrene, and cyanoacrylate.

(6-4) Quaternary ammonium cation group-containing vinyl monomers: quaternized compounds (those quaternized compounds using quaternizing agents such as methyl chloride, dimethylsulfuric acid, benzyl chloride, and dimethylcarbonate) of tertiary amino group-containing vinyl monomers such as dimethylaminoethyl (meth)acrylate, diethylaminoethyl (meth)acrylate, dimethylaminoethyl(meth)acrylamide, diethylaminoethyl(meth)acrylamide, and diallylamine.

(6-5) Nitro group-containing vinyl monomers: nitrostyrene.

(7) Epoxy group-containing vinyl monomers: glycidyl (meth)acrylate, tetrahydrofurfuryl (meth)acrylate, and p-vinylphenylphenyl oxide.

(8) Halogen-containing vinyl monomers: vinyl chloride, vinyl bromide, vinylidene chloride, allyl chloride, chlorostyrene, bromostyrene, dichlorostyrene, chloromethylstyrene, tetrafluorostyrene, and chloroprene.

(9) Vinyl Esters, Vinyl (Thio)Ethers, Vinyl Ketones, and Vinylsulfones:

(9-1) vinyl esters such as vinyl acetate, vinyl butylate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinyl methoxyacetate, vinyl benzoate, ethyl α-ethoxyacrylate, alkyl methacrylate having C1 to C50 alkyl group [methyl (meth)acrylate, ethyl (meth)acrylate, propyl (meth)acrylate, butyl (meth)acrylate, 2-ethylhexyl (meth) acrylate, dodecyl (meth)acrylate, hexadecyl (meth)acrylate, heptadecyl (meth)acrylate, eicosyl (meth)acrylate], dialkyl fumarate (fumaric acid dialkyl esters) (two alkyl groups are straight, branched or alicyclic groups with 2 to 8 carbon atoms), dialkyl maleate (maleic acid dialkyl esters) (two alkyl groups are straight, branched or alicyclic groups with 2 to 8 carbon atoms), poly(meth)allyloxyalkanes [diallyloxyethane, triallyloxyethane, tetraallyloxyethane, tetraallyloxypropane, tetraallyloxybutane, and tetramethallyloxyethane], vinyl monomers having polyalkylene glycol chains [polyethylene glycol (molecular weight 300) mono(meth) acrylate, polypropylene glycol (molecular weight 500) monoacrylate, methyl alcohol ethylene oxide (hereinafter, ethylene oxide is abbreviated as EO) 10 mole adduct (meth) acrylate, lauryl alcohol EO 30 mole adduct (meth)acrylate], poly (meth)acrylates [poly(meth)acrylate of polyhydric alcohol: ethylene glycol di(meth)acrylate, propylene glycol di(meth)acrylate, neopentyl glycol di(meth)acrylate, trimethylolpropane tri(meth)acrylate, and polyethylene glycol di(meth)acrylate].

(9-2) Vinyl (thio)ethers such as vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1, 2-pyrane, 2-butoxy-2'-vinyloxydiethyl ether, vinyl 2-ethylmercaptoethyl ether, acetoxystyrene, and phenoxystyrene.

(9-3) Vinyl ketones such as vinyl methyl ketone, vinyl ethyl ketone, and vinyl phenyl ketone:

Vinylsulfones such as divinyl sulfide, p-vinyldiphenyl sulfide, vinyl ethyl sulfide, vinyl ethyl sulfone, divinyl sulfone, and divinyl sulfoxide.

(10) Other Vinyl Monomers:

Isocyanatoethyl (meth)acrylate, and m-isopropenyl-α,α-dimethylbenzyl isocyanate.

The vinyl resins may include polymers obtained by copolymerization of two or more kinds of arbitrary monomers described in (1) to (10) preferably at arbitrary ratio to adjust the content of the carboxyl groups in the resin particles (A) in a range of 1 to 50%, and preferable examples may be styrene-(meth)acrylic acid ester-(meth)acrylic acid copolymers, styrene-butadiene-(meth)acrylic acid copolymers, (meth) acrylic acid-acrylic acid ester copolymers, styrene-acrylonitrile-(meth)acrylic acid-divinylbenzene copolymers, styrene-styrenesulfonic acid-(meth)acrylic acid ester copolymers, vinyl acetate-crotonic acid copolymers, vinyl acetate-crotonic acid-(meth)acrylic acid ester copolymers, vinyl acetate-(meth)acrylic acid copolymers, vinyl acetate-(meth) acrylic acid ester copolymers, vinyl acetate-(meth)acrylic acid-(meth)acrylic acid ester copolymers, vinyl acetate-maleic anhydride copolymers, vinyl acetate-maleic anhydride-(meth) acrylic acid ester copolymers, and salts of these copolymers.

In the case the resin (a) forms resin particles (A) in a water-based dispersion, it is at least needed that the resin (a) is not completely dissolved in water under condition for forming the water-based dispersion. Therefore, the ratio of hydrophobic monomers and hydrophilic monomers composing the vinyl resin is generally preferably 10% or higher of the hydrophobic monomers and more preferably 30% or higher, although it depends on the types of the selected monomers. If the ratio of the hydrophobic monomers is less than 10%, the vinyl resin becomes water-soluble and the particle diameter evenness of (C) and (D) is sometimes deteriorated. Herein, the term, hydrophilic monomers, means monomers dissolved at an arbitrary ratio in water, and the term, hydrophobic monomers, means other monomers (basically, monomers which are not compatible with water).

Polyester resins may include condensation polymers of polyols with polycarboxylic acids, their anhydrides, or their lower alkyl esters, and metal salts of these condensation polymers. Polyols may include diols (11) and tri- to octa-hydric or higher-hydric polyols (12), and polycarboxylic acids, their anhydrides, or their lower alkyl esters may include dicarboxylic acids (13), tri- to hexa- or higher polycarboxylic acids (14), their anhydrides, or their lower alkyl esters.

The ratio of polyols and polycarboxylic acids is preferably (2/1) to (1/5), more preferably (1.5/1) to (1/4), and even more preferably (1/1.3) to (1/3) as equivalent ratio [OH]/[COOH] of hydroxyl group [OH] and carboxyl group [COOH].

To adjust the content of the carboxyl groups within the above-mentioned preferable range, polyesters with excess hydroxyl groups may be treated with polycarboxylic acids.

Examples of diols (11) may be alkylene glycol having 2 to 36 carbon atoms (ethylene glycol, 1,2-propylene glycol, 1,3-propylene glycol, 1,4-butanediol, 1,6-hexanediol, octanediol, decanediol, dodecanediol, tetradecanediol, neopentyl glycol, and 2,2-diethyl-1,3-propanediol); alkylene ether glycol having 4 to 36 carbon atoms (diethylene glycol, triethylene glycol, dipropylene glycol, polyethylene glycol, polypropylene glycol, and polytetramethylene ether glycol); alicyclic diols having 4 to 36 carbon atoms (1,4-cyclohexanedimethanol, and hydrogenated bisphenol A); alkylene oxide (hereinafter, abbreviated as AO) [EO, propylene oxides (hereinafter, abbreviated as PO), and butylene oxides (hereinafter, abbreviated as BO)] adducts (addition moles of 1 to 120) of the above-mentioned alkylene glycols or alicyclic diols; adducts (addition moles of 2 to 30) of AO (EO, PO, and BO) of bisphenols (bisphenol A, bisphenol F, and bisphenol S); poly-lactone diols (poly-ε-caprolactone diol); and polybutadiene diol.

As diols, besides the above-mentioned diols having no functional group other than hydroxyl groups, diols (11a) having other functional groups may be used. Examples of (11a) may include diols having carboxyl groups, diols having sulfonic acid groups or sulfamic acid groups; and their salts.

Examples of the diols having carboxyl groups may include dialkylolalkane acids (those with C6 to C24 such as 2,2-dimethylolpropionic acid (DMPA), 2,2-dimethylolbutanoic acid, 2,2-dimethylolheptanoic acid, and 2,2-dimethyloloctanoic acid).

Examples of dials having sulfonic acid groups or sulfamic acid groups may include sulfamic acid diols [N,N-bis(2-hdyroxyalkyl)sulfamic acid (C1-C6 alkyl), their AO adducts (AO may be EO or PO and addition moles of AO is 1 to 6): for instance, N—N-bis(2-hydroxyethyl)sulfamic acid and N,N-bis(2-hdyroxyethyl)sulfamic acid PO 2 mole adduct]; and bis(2-hydroxyethyl) phosphate.

The neutralizing salt groups of these diols having neutralizing salt groups may be tertiary amines having 3 to 30 carbon atoms (triethylamine) and/or alkali metals (sodium salt).

Preferable compounds among them are alkylene glycols having 2 to 12 carbon atoms, diols having carboxyl group, AO adducts of bisphenols, and their combinations.

Examples of tri- to octa-hydric or higher hydric polyols (12) may include tri- to octa-hydric or higher hydric aliphatic alcohols having 3 to 36 carbon atoms (alkane polyols and their intramolecular or intermolecular dehydrated compounds such as glycerin, trimethylolethane, trimethylolpropane, pentaerythritol, sorbitol, sorbitan, and polyglycerin; saccharides and their derivatives such as sucrose and methyl glucoside); polyhydric aliphatic alcohol AO adducts (addition moles of 2 to 120); trisphenols (such as trisphenol PA) AO adducts (addition moles of 2 to 30); novolak resin (such as phenol novolak and cresol novolak) AO adducts (addition moles of 2 to 30); acryl polyols [copolymers of hydroxyethyl (meth)acrylate and other vinyl monomers].

Preferable examples among them are tri- to octa-hydric or higher hydric aliphatic alcohols and novolak resin AO adducts, and more preferable examples are novolak resin AO adducts.

Examples of dicarboxylic acids (13) may include alkanedicarboxylic acids having 4 to 36 carbon atoms (such as succinic acid, adipic acid, sebacic acid, azelaic acid, dodecanedicarboxylic acid, octadecanedicarboxylic acid, and decylsuccinic acid) and alkenylsuccinic acids (such as dodecenylsuccinic acid, pentadecenylsuccinic acid, and octadecenylsuccinic acid); alicyclic dicarboxylic acids having 6 to 40 carbon atoms [such as dimer acid (dimerized linoleic acid), alkanedicarboxylic acids having 4 to 36 carbon atoms (such as maleic acid, fumaric acid, and citraconic acid); aromatic dicarboxylic acids having 8 to 36 carbon atoms (such as phthalic acid, isophthalic acid, terephthalic acid, and naphthalenedicarboxylic acid). Preferable examples among them are alkanedicarboxylic acids having 4 to 20 carbon atoms and aromatic dicarboxylic acids having 8 to 20 carbon atoms.

Examples of tri- to hexa- or higher polycarboxylic acids (14) may include aromatic polycarboxylic acid having 9 to 20 carbon atoms (such as trimellitic acid and pyromellitic acid).

As the dicarboxylic acids (13) or tri- to hexa- or higher polycarboxylic acids (14) may be employed acid anhydrides and lower alkyl esters having 1 to 4 carbons atom(s) (such as methyl esters, ethyl esters, and isopropyl esters) of the above-mentioned acids.

Examples of the polyurethane resins may include addition polymers of polyisocyanates (15) and active hydrogen-containing compounds {water, polyols [diols (11) [including diols (11a) having functional groups other than hydroxyl group], and tri- to octa-hydric or higher hydric polyols (12)], polycarboxylic acids [dicarboxylic acids (13), and tri- to hexa- or higher polycarboxylic acids (14)], polyester polyols obtained by polycondensation of polyols and polycarboxylic acids, ring-opening polymers of lactones having 6 to 12 carbon atoms, polyamines (16), polythiols (17), and combinations of these compounds} as well as amino group-containing polyurethane resins obtained by reaction of isocyanato group-terminated prepolymers, which are obtained by reaction of (15) and active hydrogen-containing compounds, with primary and/or secondary monoamines (18) in an equivalent amount to that of the isocyanato groups of the prepolymers.

The content of carboxyl groups in the polyurethane resins is preferably 0.1 to 10%.

Examples of diols (11), tri- to octa- or higher polyols (12), dicarboxylic acids (13), and tri- to hexa- or higher polycarboxylic acids (14) may include the above-exemplified compounds and preferable examples are those same as described above.

Examples of the polyisocyanates (15) may include aromatic polyisocyanates having 6 to 20 carbon atoms (excluding the carbon in NCO group, and the same is applied hereinafter), aliphatic polyisocyanates having 2 to 18 carbon atoms, alicyclic polyisocyanates having 4 to 15 carbon atoms, aromatic aliphatic polyisocyanates having 8 to 15 carbon atoms, and polyisocyanate-modified products of these compounds (modified compounds containing urethane groups, carbodiimido groups, allophanato groups, urea groups, biuret groups, urethodione groups, urethoimine groups, isocyanurate groups, and oxazolidone groups) and mixtures of two or more of these compounds.

Specific examples of the above-mentioned aromatic polyisocyanates may be 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI), crude MDI [phosgene compounds of crude diaminophenylmethane (condensation product of formaldehyde and an aromatic amines (aniline) or their mixture; and mixture of diaminodiphenylmethane and a small amount (e.g. 5 to 20%) of tri- or higher-functional polyamines); polyallyl polyisocyanate (PAPI)], 1,5-naphthylene diisocyanate, 4,4',4"-triphenylmethane triisocyanate, m- and p-isocyanatophenylsulfonyl isocyanate.

Specific examples of the above-mentioned aliphatic polyisocyanates may be aliphatic polyisocyanates such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate.

Specific examples of the above-mentioned alicyclic polyisocyanates may be isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- and/or 2,6-norbornene diisocyanate.

Specific examples of the above-mentioned aromatic aliphatic polyisocyanates may be m- and/or p-xylylene diisocyanate (XDI), α,α,α',α'-tetramethylxylylene diisocyanate (TMXDI).

Specific examples of modified compounds of the above-mentioned polyisocyanates are modified compounds having urethane groups, carbodiimido groups, allophanato groups, urea groups, biuret groups, urethodione groups, urethoimine groups, isocyanurate groups, and oxazolidone groups.

Specific examples may include modified compounds of polyisocyanates such as modified MDI (such as urethane-modified MDI, carbodiimide-modified MDI, and trihydrocarbylphosphate-modified MDI), urethane-modified TDI, and mixtures of these two or more compounds (e.g. combinations of modified MDI and urethane-modified TDI (isocyanato-containing prepolymer)).

Preferable examples among them are aromatic polyisocyanates having 6 to 15 carbon atoms, aliphatic polyisocyanates having 4 to 12 carbon atoms, and alicyclic polyisocyanates having 4 to 15 carbon atoms, and more preferable examples are TDI, MDI, hydrogenated MDI, and IPDI.

Examples of polyamines (16) are (C2 to C18) aliphatic polyamines: (1) aliphatic polyamines {C2 to C6 alkylenediamine (such as ethylenediamine, propylenediamine, trimethylenediamine, tetramethylenediamine, and hexamethylenediamine), (C2-C6) polyalkylene polyamine (such as diethylenetriamine, iminobispropylamine, bis(hexamethylene)triamine, triethylenetetramine, tetraethylenepentamine, and pentaethylene hexamine)}; (2) (C1 to C4) alkyl- or (C2 to C4) hydroxyalkyl-substituted compounds of the above-exemplified compounds [such as (C1 to C3) dialkylaminopropylamine, trimethylhexamethylenediamine, aminoethylethanolamine, 2,5-dimethyl-2,5-hexamethylenediamine, and methyliminobispropylamine]; (3) alicyclic or heterocyclic aliphatic polyamines [such as 3,9-bis(3-aminopropyl)-2,4,8,10-tetraoxaspiro[5,5]undecane]; (4) (C8 to C15) aromatic ring-containing aliphatic amines (such as xylylenediamine and tetrachloro-p-xylylenediamine), (C4 to C15) alicyclic polyamines: 1,3-diaminocyclohexane, isophoronediamine, menthenediamine, and 4,4'-methyledicyclohexanediamine (hydrogenated methylenedianiline); (C4 to C15) heterocyclic polyamines such as piperazine, N-aminoethylpiperazine, 1,4-diaminoethylpiperazine, and 1,4-bis(2-amino-2-methylpropyl)piperazine, (C6 to C20) aromatic polyamines: (1) unsubstituted aromatic polyamines[1,2-, 1,3-, and 1,4-phenylenediamine, 2,4'- and 4,4'-diphenylmethanediamine, crude diphenylmethanediamine (polyphenylpolymethylenepolyamine), diaminodiphenylsulfone, benzidine, thiodianiline, bis(3,4-diaminophenyl)sulfone, 2,6-diaminopyridine, m-aminobenzylamine, triphenylmethane-4,4',4"-triamine and naphthylenediamine]; (2) nuclear substituted alkyl group (C1 to C4 alkyl group such as methyl, ethyl, n- and iso-propyl, and butyl)-containing aromatic polyamines such as 2,4- and 2,6-tolyenediamine, crude tolylenediamine, diethyltolylenediamine, 4,4'-diamino-3,3'-dimethyldiphenylmethane, 4,4'-bis(o-toluidine), dianisidine, diaminoditolylsulfone, 1,3-dimethyl-2,4-diaminobenzene, 1,3-dimethyl-2,6-diaminobenzene, 1,4-diisopropyl-2,5-diaminobenzene, 2,4-diaminomesitylene, 1-methyl-3,5-diethyl-2,4-diaminobenzene, 2,3-dimethyl-1,4-diaminonaphthalene, 2,6-dimethyl-1,5-diaminonaphthalene, 3,3',5,5'-tetramethylbenzidine, 3,3',5,5'-tetramethyl-4,4'-diaminodiphenylmethane, 3,5-diethyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraethyl-4,4'-diaminodiphenyl ether, 3,3',5,5'-tetraisopropyl-4,4'-diaminodiphenylsulfone, and mixtures of their isomers at various mixing ratios; (3) nuclear substituted electron attractive group (for example, halogen such as Cl, Br, I, and F; alkoxy group such as methoxy and ethoxy; and nitro group)-containing aromatic polyamines (such as methylene-bis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, 4,4'-diamino-3,3'-dimethyl-5,5'-dibromodiphenylmethane, 3,3'-dichlorobenzidine, 3,3'-dimethoxybenzidine, bis(4-amino-3-chlorophenyl) oxide, bis(4-amino-2-chlorophenyl) propane, bis(4-amino-2-chlorophenyl) sulfone, bis (4-amino-3-methoxyphenyl) decane, bis(4-aminophenyl)

sulfide, bis(4-aminophenyl) telluride, bis(4-aminophenyl) selenide, bis(4-amino-3-methoxyphenyl) disulfide, 4,4'-methylenebis(2-iodoaniline), 4,4'-methylenebis(2-bromoaniline), 4,4'-methylenebis(2-fluoroaniline), 4-aminophenyl-2-chloroaniline); (4) secondary amino group-containing aromatic polyamines (compounds obtained by replacing a portion or all of —NH$_2$ of the above-mentioned aromatic polyamines (1) to (3) with —NH—R' (R' denotes alkyl, e.g. lower alkyl such as methyl and ethyl), (such as 4,4'-di(methylamino) diphenylmethane, and 1-methyl-2-methylamino-4-aminobenzene), polyamide polyamines: low molecular weight polyamide polyamines obtained by condensation of dicarboxylic acids (dimer acids or the like) and excess amounts of (2 or more moles per 1 mole acid) polyamines (the above-mentioned alkylenediamine, polyalkylenepolyamine, or the like); polyether polyamines: and hydrogenated compounds of cyanoethylated compounds of polyether polyols (polyalkylene glycol or the like).

Examples of the polythiols (17) may include alkanedithiols having 2 to 36 carbon atoms (such as ethylenedithiol, 1,4-butanedithiol, and 1,6-hexanedithiol).

Examples of the primary and/or secondary monoamines (18) may include alkylamines having 2 to 24 carbon atoms (such as ethylamine, n-butylamine, and isobutylamine).

Examples of the epoxy resins may include ring-opening polymers of polyepoxide (19), polymerization adducts of the polyepoxide (19) and active hydrogen-containing compounds {such as water, polyols (the above-mentioned diols (11) and tri- to octa- or higher hydric polyols (12)), the above-mentioned dicarboxylic acids (13), the above-mentioned tri- to hexa- or higher polycarboxylic acids (14), the above-mentioned polyamines (16), and the above-mentioned polythiols (17)}, and cured compounds of polyepoxides (19) with dicarboxylic acids (13) or acid anhydrides of tri- to hexa- or higher polycarboxylic acids (14).

The polyepoxides (19) used in the invention are not particularly limited if they have two or more epoxy groups in a molecule. Examples of the polyepoxides (19) which are preferable are those having 2 to 6 epoxy groups in a molecule from a viewpoint of mechanical properties of cured products. The epoxy equivalent (molecular weight per one epoxy group) of the polyepoxides (19) is generally 65 to 1000 and preferably 90 to 500. If the epoxy equivalent exceeds 1000, the crosslinking structure becomes loose and physical properties such as water resistance, chemical resistance, and mechanical strength of cured products are deteriorated and on the other hand, if the epoxy equivalent is lower than 65, it becomes difficult to synthesize such polyepoxides.

Examples of the polyepoxides (19) are aromatic polyepoxy compounds, heterocyclic polyepoxy compounds, alicyclic polyepoxy compounds, and aliphatic polyepoxy compounds. Examples of the aromatic polyepoxy compounds are glycidyl ethers and glycidyl esters of polyhydric phenols, glycidyl aromatic polyamines, and glycidylated aminophenols. Examples of glycidyl ethers of polyhydric phenols are bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl ether, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthalene diglycidyl ether, dihydroxybiphenyl diglycidyl ether, octachloro-4,4'-dihydroxybiphenyl diglycidyl ether, tetramethylbiphenyl diglycidyl ether, dihydroxynaphthylcresol triglycidyl ether, tris(hydroxyphenyl)methane triglycidyl ether, dinaphthyltriol triglycidyl ether, tetrakis(4-hydroxyphenyl)ethane tetraglycidyl ether, p-glycidylphenyldimethyltolylbisphenol A glycidyl ether, trismethyl-tert-butyl-butylhydroxymethane triglycidyl ether, 9,9'-bis(4-hydroxyphenyl)fluorene diglycidyl ether, 4,4'-oxybis(1,4-phenylethyl)tetracresol glycidyl ether, 4,4'-oxybis(1,4-phenylethyl)phenyl glycidyl ether, bis(dihydroxynaphthalene)tetraglycidyl ether, phenol or cresol novolak resin glycidyl ethers, limonenephenolnovolak resin glycidyl ethers, glycidyl ethers obtained by reaction of 2 mole of bisphenol A with 3 mole of epichlorohydrin, polyglycidyl ethers of polyphenols obtained by condensation reaction of phenol with glyoxal, glutalaldehyde or formaldehyde, and polyglycidyl ethers of polyphenols obtained by condensation reaction of resorcin and acetone. Examples of glycidyl esters of polyhydric phenols may include phthalic acid diglycidyl ester, isophthalic acid diglycidyl ester, and terephthalic acid diglycidyl ester. Examples of glycidyl aromatic polyamines are N,N-diglycidylaniline, N,N,N',N'-tetraglycidylxylylenediamine, and N,N,N',N'-tetraglycidyldiphenylmethanediamine. Further, examples of the above-mentioned aromatic types in the invention may include diglycidyl urethane compounds obtained by addition reaction of p-aminophenol triglycidyl ether, tolylene diisocyanate, or diphenylmethane diisocyanate with glycidol, and glycidyl-containing polyurethane (pre)polymers which are obtained by reaction of the above-mentioned two reaction products with polyols and diglycidyl ethers of bisphenol A alkyleneoxide (ethylene oxide or propylene oxide) adducts. Examples of the heterocyclic polyepoxy compounds are trisglycidylmelamine; and examples of the alicyclic polyepoxy compounds are vinylcyclohexene dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl-3',4'-epoxy-6'-methylcyc lohexane carboxylate, bis(3,4-epoxy-6-methylcyclohexylmethyl) adipate, and bis(3,4-epoxy-6-methylcyclohexylmethyl)butylamine, and dimer acid diglycidyl ester. Further, examples of the alicyclic types may also include nuclear-hydrogenated compounds of the above-mentioned aromatic polyepoxy compounds; examples of the aliphatic polyepoxy compounds may include polyglycidyl ethers of polyhydric aliphatic alcohols, polyglycidyl esters of aliphatic polycarboxylic acids, and glycidyl aliphatic amines. Examples of polyglycidyl ethers of polyhydric aliphatic alcohols may include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, and polyglycerol polyglycidyl ether. Examples of polyglycidyl esters of aliphatic polycarboxylic acids are diglycidyl oxalate, diglycidyl maleate, diglycidyl succinate, diglycidyl glutarate, diglycidyl adipate, and diglycidyl pimelate. Examples of glycidyl aliphatic amines may include N,N,N', N'-tetraglycidylhexamethylenediamine. In the invention, aliphatic type compounds may include (co)polymers of diglycidyl ethers and glycidyl (meth)acrylate. Preferable examples among them are aliphatic polyepoxy compounds and aromatic polyepoxy compounds. Two or more types of the polyepoxides of the invention may be used in combination.

The resin particles (D) of the first invention may be any particles produced by any production method if they are resin particles (B) comprising the second resin (b) which are coated at 0.1 to 4.9% in the surfaces with the resin particles (A) comprising the first resin (a) having certain resin physical properties or film (P) comprising the resin (a). A portion of the resin particles (A) may be formed into film, and thereby (A) and (P) are allowed to exist together. The covering of the surfaces of (B) are preferably by the film (P) in terms of smoothness of the resin particles surfaces.

The resin particles (D) are preferable to be produced by the following production method of the second invention since the resin particles have even particle diameters.

In the production method of the second invention, at the time of mixing the water-based dispersion (W) of the resin particles (A) with resin (b) or its solvent solution (O1), alternatively a precursor (b0) of the resin (b) or its solvent solution (O2), and dispersing (O1) or (O2) in (W) to form resin particles (B) comprising (b), the resin particles (A) are deposited on the surfaces of the resin particles (B), so that the resin particles (C) are prevented from agglomeration and (C) are made difficult to be broken under high shearing condition. Accordingly, the particle diameter of (C) is converged upon a specific value and the evenness of the particle diameter can be increased. Therefore, the resin particles (A) are preferable to have characteristics of having strength sufficient not to be broken by shearing at a temperature in the case of dispersion; hardly dissolved or swollen in water; and difficult to be dissolved in (b) or its solvent solution, alternatively (b0) or its solvent solution.

Between (b) and (b0), in terms of the productivity, a method of using (b) or its solvent solution is preferable.

In terms of suppression of dissolving or swelling of the resin particles (A) in water or solvent to be used at the time of dispersion, the molecular weight of the resin (a), the sp value (a calculation method of sp value is described in "Polymer Engineering and Science, February, 1974, Vol. 14, No. 2 P. 147-154), crystallinity, and molecular weight between crosslinking points are preferable to be adjusted properly with respect to the resin (a).

The number average molecular weight (measured by gel permeation chromatography, hereinafter, it is abbreviated as Mn) of the resin (a) is generally 100 to 5,000,000, preferably 200 to 5,000,000, and more preferably 500 to 500,000; and sp value is generally 7 to 18 and preferably 8 to 14. The melting point (measured by DSC) of the resin (a) is generally 50° C. or higher and preferably 80 to 200° C.

In the invention, number average molecular weight (Mn) and weight average molecular weight (Mw) of resins such as polyester resins other than polyurethane resins can be measured using soluble matter in tetrahydrofuran (THF) under the following conditions by gel permeation chromatography (GPC).
Apparatus (one example): HLC-8120, manufactured by Tosoh Corporation
Column (one example): TSKgel GMHXL (two columns), TSKgel Multipore HXL-M (one column)
Sample solution: 0.25% THF solution
Solution injection amount: 100 μl
Flow rate: 1 ml/minute
Measurement temperature: 40° C.
Detection apparatus: refraction index detector
Standard substance: Standard polystyrene manufactured by Tosoh Corporation (TSK standard POLYSTYRENE) 12 products (Mw 500, 1050, 2800, 5970, 9100, 18100, 37900, 96400, 190000, 355000, 1090000, 2890000)

Mn and Mw of polyurethane resins are measured by GPC under the following conditions.
Apparatus (one example): HLC-8220 GPC, manufactured by Tosoh Corporation
Column (one example): Guardcolumn α, TSKgel α-M
Sample solution: 0.125% dimethylformamide solution
Solution injection amount: 100 μl
Flow rate: 1 ml/minute
Measurement temperature: 40° C.
Detection apparatus: refraction index detector
Standard substance: Standard polystyrene manufactured by Tosoh Corporation (TSK standard POLYSTYRENE) 12 products (Mw 500, 1050, 2800, 5970, 9100, 18100, 37900, 96400, 190000, 355000, 1090000, 2890000)

In terms of evenness of the particle diameter, powder flowability, thermal resistance at the time of storage, and stress resistance with respect to the resin particles (C) and (D), the glass transition temperature (Tg) of the resin (a) is generally in a range of 20° C. to 250° C., preferably in a range of 30° C. to 230° C., more preferably in a range of 40° C. to 200° C., and even more preferably in a range of 50° C. to 100° C.

If the Tg is lower than the temperature at which the water-based resin dispersion is produced, the effect of preventing agglomeration or breakage is lowered and the effect of improving the evenness of the particle diameter is lowered.

Further, the Tg of the resin particles (A) comprising the resin (a) or Tg of the film (P) comprising the resin (a) is preferably in a range of 20° C. to 200° C., more preferably in a range of 30° C. to 200° C., and even more preferably in a range of 40° C. to 85° C. because of the same reasons.

In the invention, the Tg is a value measured by DSC measurement or flow tester measurement (in the case DSC measurement is impossible).

The flow tester measurement is carried out using an overhead type flow tester CFT 500 model manufactured by Shimadzu Corporation. The conditions of the flow tester measurement are as follows and the measurements described below are all carried out under the conditions.
(Flow Tester Measurement Conditions)
Load: 30 kg/cm$^2$, Temperature increase speed: 3.0° C./min, die aperture diameter: 0.50 mm: and die length: 10.0 mm.

The point A (the temperature at which a sample receives compressive load and starts deforming) in the flow chart shown in FIG. 1 is defined as the glass transition temperature (Tg): the point B (the temperature at which the inner voids disappear and a single transparent body or phase with uniform appearance is formed while keeping uneven stress distribution) is defined as the initial softening temperature (Ts): the point C (the temperature at which a piston again clearly starts decreasing after the piston is slightly elevated due to the thermal expansion of a sample) is defined as the flow starting temperature (Tfb): and the point D (the temperature at the point determined by calculating ½ (X) of the difference between Smax at the flow finishing point and the minimum value 5 min and adding X and 5 min) is defined as the flow temperature (T1/2).

In terms of thermal resistance at the time of storage, stress resistance, and fixing properties on a paper, the initial softening temperature (Ts) of the resin (a) is generally 40° C. to 270° C., preferably 50° C. to 250° C., more preferably 60° C. to 220° C., and even more preferably 70° C. to 160° C.: and the flow temperature (T1/2) is generally 60° C. to 300° C., preferably 65° C. to 280° C., more preferably 70° C. to 250° C., and even more preferably 80° C. to 190° C. In the case of using the resin (a) for a toner, if the initial softening temperature (Ts) and the flow temperature (T1/2) of the resin (a) remaining on the surfaces are high temperatures, they sometimes becomes a factor of deteriorating low temperature fixing properties and high luster. The initial softening temperature and the flow temperature in the invention are values calculated by the above-mentioned flow tester measurement.

The temperature difference of the glass transition temperature (Tg) and the flow temperature (T1/2) of the resin (a) is generally 0° C. to 120° C., preferably 0° C. to 115° C., more preferably 0° C. to 110° C., and even more preferably 0° C. to 105° C. If the temperature difference of the glass transition temperature and the flow temperature of the resin (a) remaining on the surfaces is within the above-mentioned range, in the case the resin particles are used for a toner, both of the low temperature fixing properties and high luster of resin particles are easily satisfied simultaneously.

The temperature difference of the glass transition temperature (Tg) and the initial softening temperature (Ts) of the resin (a) is generally 0° C. to 100° C., preferably 0° C. to 70° C., more preferably 0° C. to 50° C., and even more preferably 0° C. to 35° C. If the temperature difference of the glass transition temperature and the initial softening temperature of the resin (a) remaining on the surfaces is within the above-mentioned range, in the case the resin particles are used for a toner, both of the low temperature fixing properties and high luster of resin particles are easily satisfied simultaneously.

In the production method of the second invention, the resin particles (D) can be obtained by removing a portion of the resin particles (A) comprising the resin (a) or the film (P) comprising the resin (a) depositing on the surfaces by separation and/or dissolution, however if the initial softening temperature (Ts), the flow temperature (T1/2) and the glass transition temperature (Tg) of the resin (a) which is not completely removed and remains on the surfaces are out of the above-mentioned ranges, in the case of using the resin (a) for a toner, they sometimes becomes a factor of deteriorating low temperature fixing properties and high luster.

The resin (a) used in the invention is a resin satisfying all of the initial softening temperature in a range of 40° C. to 270° C.; glass transition temperature in a range of 20° C. to 250° C.; flow temperature in a range of 60° C. to 300° C.; and difference of the glass transition temperature and flow temperature in a range of 0° C. to 120° C.

With respect to the Shore D hardness, which is a standard of hardness, the hardness of the resin particles (A) or the film (P) comprising the resin (a) is generally 30 or higher and particularly preferably in a range of 45 to 100. Further, it is also preferable that the hardness is within the above-mentioned range in the case of immersion in water or in a solvent for a prescribed duration.

In the water-based dispersion (W) of the resin particles (A), a solvent other than water (acetone, methyl ethyl ketone, or the like) which is compatible with water among solvents (u) described somewhere below may be contained. In this case, the solvent to be contained may be any kind in any content if it does not cause agglomeration of the resin particles (A); does not dissolve the resin particles (A); and does not inhibit granulation of the resin particles (C), however, the solvent is preferable, by using in an amount of 40% or less in total with water, not to remain in the resin particles (D) after drying.

A method for producing the water-based dispersion (W) of the resin particles (A) from the resin (a) is not particularly limited and the following methods (1) to (8) can be exemplified.

(1) In the case of vinyl resins, a method of directly producing the water-based dispersion (w) of the resin particles (A) by polymerization reaction such as a suspension polymerization method, an emulsification polymerization method, a seed polymerization method or a dispersion polymerization method from monomers as starting raw materials.

(2) In the case of addition polymerization or condensation type resins such as polyester resins, a method of dispersing a precursor (a monomer, an oligomer, and the like) or its solvent solution in a water-based solvent if necessary in the presence of a dispersant and thereafter carrying out curing step by heating or adding a curing agent to produce the water-based dispersion of the resin particles (A).

(3) In the case of addition polymerization or condensation type resins such as polyester resins, a method of dissolving a proper emulsifier in a precursor (a monomer, an oligomer, and the like) or its solvent solution (it is preferable to be a liquid. It may be liquefied by heating.), successively adding water for phase inversion emulsification, and carrying out curing by adding a curing agent to produce the water-based dispersion of the resin particles (A).

(4) A method of pulverizing a resin previously, which is produced by polymerization reaction (any polymerization reaction manner such as addition polymerization, ring-opening polymerization, polyaddition, addition condensation polymerization, and condensation polymerization), by mechanically rotating or jet type pulverizer, classifying the pulverized resin for obtaining resin particles, and dispersing the resin particles in water in the presence of a proper dispersant.

(5) A method of previously producing a resin by polymerization reaction (any polymerization reaction manner such as addition polymerization, ring-opening polymerization, polyaddition, addition condensation polymerization, and condensation polymerization), dissolving the obtained resin in a solvent, spraying the resin solution in atomized state for obtaining resin particles, and dispersing the resin particles in water in the presence of a proper dispersant.

(6) A method of previously producing a resin by polymerization reaction (any polymerization reaction manner such as addition polymerization, ring-opening polymerization, polyaddition, addition condensation polymerization, and condensation polymerization), dissolving the obtained resin in a solvent for obtaining a resin solution, either by adding a poor solvent to the resin solution or cooling the resin solution for precipitating the resin particles, then removing the solvent for obtaining the resin particles, and dispersing the resin particles in water in the presence of a proper dispersant.

(7) A method of previously producing a resin by polymerization reaction (any polymerization reaction manner such as addition polymerization, ring-opening polymerization, polyaddition, addition condensation polymerization, and condensation polymerization), dissolving the obtained resin in a solvent for obtaining a resin solution, dispersing the resin solution in water in the presence of a proper dispersant, and removing the solvent by heating or reducing pressure.

(8) A method of previously producing a resin by polymerization reaction (any polymerization reaction manner such as addition polymerization, ring-opening polymerization, polyaddition, addition condensation polymerization, and condensation polymerization), dissolving the obtained resin in a solvent for obtaining a resin solution, dissolving a proper emulsifier, and adding water for phase inversion emulsification.

In the above-mentioned methods (1) to (8), examples of the emulsifying agent or dispersing agent to be used in combination may be a conventionally known surfactant (s), a water-soluble polymer (t), or the like. Further, as an auxiliary for emulsification or dispersion, a solvent (u), a plasticizer (v), or the like may be used in combination.

The surfactant (s) may include anionic surfactants (s-1), cationic surfactants (s-2), amphoteric surfactants (s-3), and nonionic surfactants (s-4). The surfactant (s) may be two or more surfactants used in combination. Practical examples of (s) are the following as well as those described in JP-A No. 2002-284881.

Examples of the anionic surfactants (s-1) are carboxylic acids and their salts, sulfuric acid ester salts, salts of carboxymethylation compounds, sulfonic acid salts, and phosphoric acid ester salts.

Examples of the carboxylic acid and their salts may be saturated or unsaturated aliphatic acids having 8 to 22 carbon atoms and their salts such as capric acid, lauric acid, myristic acid, palmitic acid, stearic acid, arachidinic acid, behenic acid, oleic acid, linoleic acid, ricinoleic acid, and higher aliphatic acid mixtures obtained by saponification of coconut oil, palm kernel oil, rice bran oil, and beef tallow.

Examples of their salts may be sodium salts, potassium salts, amine salts, ammonium salts, quaternary ammonium salts, and alkanolamine salts (monoethanolamine salts, diethanolamine salts, and triethanolamine salts).

Examples of the sulfuric acid ester salts to be used may include higher alcohol sulfuric acid ester salts (sulfuric acid ester salts of aliphatic alcohol having 8 to 18 carbon atoms), higher alkyl ether sulfuric acid ester salts (sulfuric acid ester salts of EO or PO 1 to 10 mole adducts of aliphatic alcohol having 8 to 18 carbon atoms), sulfated oils (those obtained by sulfating natural unsaturated oils and fats or unsaturated waxes having 12 to 50 carbon atoms and neutralizing the obtained materials), sulfated aliphatic acid esters (those obtained by sulfating lower alcohol esters (having 1 to 8 carbon atom(s)) of unsaturated aliphatic acids (having 6 to 40 carbon atoms)), and sulfated olefins (those obtained by sulfating olefins having 12 to 18 carbon atoms and neutralizing the obtained materials).

Examples of their salts may be sodium salts, potassium salts, amine salts, ammonium salts, quaternary ammonium salts, and alkanolamine salts (monoethanolamine salts, diethanolamine salts, and triethanolamine salts).

Examples of higher alcohol sulfuric acid ester salts may include octyl alcohol sulfuric acid ester salts, decyl alcohol sulfuric acid ester salts, lauryl alcohol sulfuric acid ester salts, stearyl alcohol sulfuric acid ester salts, sulfuric acid ester salts of alcohols synthesized using a Ziegler catalyst (e.g. trade name: ALFOL 1214: manufactured by CONDEA), and sulfuric acid ester salts of alcohols synthesized by oxo process (e.g. trade name: Dobanol 23, 25, and 45, Diadol 115-L, 115H, and 135 manufactured by Mitsubishi Petrochemical Co., Ltd.; trade name: Tridecanol, manufactured by Kyowa Hakko Kogyo Co., Ltd.; and trade name: Oxocol 1213, 1215, and 1415, manufactured by Nissan Chemical Industries, Ltd.).

Examples of higher alkyl ether sulfuric acid ester salts may include lauryl alcohol EO 2 mole adduct sulfuric acid ester salts and octyl alcohol EO 3 mole adduct sulfuric acid ester salts.

Examples of the sulfated oils may include salts of sulfated caster oil, peanut oil, olive oil, rape seed oil, beef tallow, and mutton tallow.

Examples of the sulfated aliphatic acid esters may include salts of sulfated materials of butyl oleate and butyl ricinoleate.

Examples of the sulfated olefins may include trade name: T-Pole (manufactured by Shell).

Examples of the salts of carboxymethylated compounds may include salts of carboxymethylated aliphatic alcohols having 8 to 16 carbon atoms and salts of carboxymethylated EO or PO 1 to 10 mole adducts of aliphatic alcohols having 8 to 16 carbon atoms.

Examples of the carboxymethylated aliphatic alcohols may include carboxymethylated octyl alcohol sodium salt, carboxymethylated lauryl alcohol sodium salt, carboxymethylated Dobanol 23 sodium salt, and carboxymethylated tridecanol sodium salt.

Examples of salts of carboxymethylated EO 1 to 10 mole adducts of aliphatic alcohols may include carboxymethylated octyl alcohol EO 3 mole adduct sodium salt, carboxymethylated lauryl alcohol EO 4 mole adduct sodium salt, and carboxymethylated tridecanol EO 5 mole adduct sodium salt.

Examples of the sulfonic acid salts to be used may include alkylbenzenesulfonic acid salts, alkylnaphthalenesulfonic acid salts, sulfosuccinic acid diester salts, $\alpha$-olefinsulfonic acid salts, Igepon T type, and sulfonic acid salts of other aromatic ring-containing compounds.

Examples of the alkylbenzenesulfonic acid salts may include dodecylbenzenesulfonic acid sodium salt.

Examples of the alkylnaphthalenesulfonic acid salts may include dodecylnaphthalenesulfonic acid sodium salt.

Examples of the sulfosuccinic acid diester salts may include sulfosuccinic acid di-2-ethylhexyl ester sodium salt.

Examples of the sulfonic acid salts of aromatic ring-containing compounds may include mono- or disulfonic acid salts of alkylated diphenyl ether and styrenated phenolsulfonic acid salts.

Examples of phosphoric acid salts may include higher alcohol phosphoric acid ester salts and higher alcohol EO adduct phosphoric acid ester salts.

Examples of higher alcohol phosphoric acid ester salts may include lauryl alcohol phosphoric acid monoester disodium salt and lauryl alcohol phosphoric acid diester sodium salt.

Examples of higher alcohol EO adduct phosphoric acid ester salt may include oleyl alcohol EO 5 mole adduct phosphoric acid monoester disodium salt.

Examples of the cationic surfactants (s-2) to be used may include quaternary ammonium type surfactants and amine salt type surfactants.

Examples of the quaternary ammonium type surfactants can be those obtained by reaction of tertiary amines having 3 to 40 carbon atoms with quaternizing agents (e.g. alkylation agent such as methyl chloride, methyl bromide, ethyl chloride, benzyl chloride, and dimethyl sulfate and EO) and may include lauryltrimethylammonium chloride, didecyldimethylammonium chloride, dioctyldimethylammonium bromide, stearyltrimethylammonium bromide, lauryldimethylbenzylammonium chloride (benzalconium chloride), cetylpyridinium chloride, polyoxyethylenetrimethylammonium chloride, and stearamidoethyldiethylmethylammonium methosulfate.

Examples of the amine salt type surfactants can be those obtained by neutralizing primary to tertiary amines with inorganic acids (e.g. hydrochloric acid, nitric acid, sulfuric acid, hydrogen iodide, phosphoric acid, and perchloric acid) or organic acids (e.g. acetic acid, formic acid, oxalic acid, lactic acid, gluconic acid, adipic acid, alkylphosphoric acid having 2 to 24 carbon atoms, malic acid, and citric acid).

Examples of the primary amine salt type surfactants may include inorganic acid salts and organic acid salts of aliphatic higher amines having 8 to 40 carbon atoms (e.g. higher amines such as laurylamine, stearylamine, cetylamine, cured beef tallow amine, and rosin amine) and higher aliphatic acid (having 8 to 40 carbon atoms, e.g. stearic acid and oleic acid) salts of lower amines (having 2 to 6 carbon atoms).

Examples of the secondary amine salt type surfactants may include inorganic acid salts and organic acid salts of EO adducts of aliphatic amines having 4 to 40 carbon atoms.

Further, examples of the tertiary amine salt type surfactants may include inorganic acid salts and organic acid salts of aliphatic amines having 4 to 40 carbon atoms (e.g. triethylamine, ethyldimethylamine, and N,N,N',N'-tetramethylenediamine), EO (2 mole or more) adducts of aliphatic amines (having 2 to 40 carbon atoms), alicyclic amines having 6 to 40 carbon atoms (e.g. N-methylpyrrolidine, N-methylpiperidine, N-methylhexamethyleneimine, N-methylmorpholine, and 1,8-diazabicyclo[5,4,0]-7-undecene) and nitrogen-containing heterocyclic aromatic amines having 5 to 30 carbon atoms (e.g. 4-dimethylaminopyridine, N-methylimidazole, and 4,4'-dipyridyl), and inorganic acid salts and organic acid salts of tertiary amines such as triethanolamine monostearate, and stearamidoethyldiethylmethylethanolamine.

Examples of the amphoteric surfactants (s-3) to be used may include carboxylic acid salt type amphoteric surfactants, sulfuric acid ester salt type amphoteric surfactants, sulfonic acid salt type amphoteric surfactants, and phosphoric acid ester salt type amphoteric surfactants.

Examples of the carboxylic acid salt type amphoteric surfactants may include amino acid type amphoteric surfactants, betaine type amphoteric surfactants, and imidazoline type amphoteric surfactants. The amino acid type amphoteric surfactants are amphoteric surfactants having an amino group and a carboxyl in a molecule, and may include compounds defined by the general formula (2).

$$(R-NH-(CH_2)_n-COO)_mM \qquad (2)$$

(Wherein, R denotes a monovalent hydrocarbon group; n denotes 1 or 2; m denotes 1 or 2; and M denotes hydrogen ion, alkali metal ion, alkaline earth metal ion, ammonium cation, amine cation, alkanolamine cation and the like.)

Examples of the amphoteric surfactants defined by the general formula (2) may include alkyl (having 6 to 40 carbon atoms)-aminopropionic acid type amphoteric surfactants (sodium stearylaminopropionate and sodium laurylaminopropionate); and alkyl (having 4 to 24 carbon atoms)-aminoacetic acid type amphoteric surfactants (sodium laurylaminoacetate).

The betaine type amphoteric surfactants are amphoteric surfactants each having a quaternary ammonium type cation portion and a carboxylic acid type anionic portion in a molecule and examples thereof may include alkyl (having 6 to 40 carbon atoms)-dimethyl betaine (stearyldimethylamino acetic acid betaine and lauryldimethylaminoacetic acid betaine), amido betaine having 6 to 40 carbon atoms (coconut oil aliphatic acid amidopropyl betaine), and alkyl (having 6 to 40 carbon atoms)-dihydroxyalkyl (having 6 to 40 carbon atoms) betaine (lauryldihydroxyethyl betaine).

The imidazoline type amphoteric surfactants are amphoteric surfactants each having an imidazoline ring-containing cation portion and a carboxylic acid type anion portion and examples thereof may include 2-undecyl-N-carboxymethyl-N-hydroxyethylimidazolinium betaine.

Examples of other amphoteric surfactants are glycine type amphoteric surfactants such as sodium lauroylglycine, sodium lauryldiaminoethylglycine, lauryldiaminoethyl glycine hydrochloride, and dioctyldiaminoethylglycine hydrochloride; sulfobetaine type amphoteric surfactants such as pentadecyl sulfotaurine; sulfonic acid salt type amphoteric surfactants, and phosphoric acid ester salt type amphoteric surfactants.

Examples of the nonionic surfactants (s-4) to be used may include AO-added nonionic surfactants and polyhydric alcohol type nonionic surfactants.

The AO-added nonionic surfactants can be obtained by directly adding AO (having 2 to 20 carbon atoms) to higher alcohols having 8 to 40 carbon atoms, higher aliphatic acids having 8 to 40 carbon atoms or alkylamines having 8 to 40 carbon atoms, causing reaction of higher aliphatic acids to polyalkylene glycols obtained by adding AO to glycols, adding AO to ester compounds obtained by reaction of higher aliphatic acids with polyhydric alcohols, or adding AO to higher aliphatic acid amides.

Examples of AO may include EO, PO, and BO.

Those preferable among them are EO and random or block adducts of EO and PO.

The number of moles of AO to be added is preferably 10 to 50 mole and 50 to 100% of AO is preferably EO.

Examples of the AO-added nonionic surfactants may include oxyalkylene alkyl ethers (the number of carbon atoms of the alkylene is 2 to 24 and the number of carbon atoms of the alkyl is 8 to 40) (e.g. octyl alcohol EO 20 mole adduct, lauryl alcohol EO 20 mole adduct, stearyl alcohol EO 10 mole adduct, oleyl alcohol EO 5 mole adduct, and lauryl alcohol EO 10 mole-PO 20 mole block adduct); polyoxyalkylene higher aliphatic acid esters (the number of carbon atoms of the alkylene is 2 to 24 and the number of carbon atoms of the higher aliphatic acid is 8 to 40) (e.g. stearic acid EO 10 mole adduct, and lauric acid EO 10 mole adduct); polyoxyalkylene polyhydric alcohol higher aliphatic acid esters (the number of carbon atoms of the alkylene is 2 to 24, the number of carbon atoms of the polyhydric alcohol is 3 to 40, and the number of carbon atoms of the higher aliphatic acid is 8 to 40) (e.g. polyethylene glycol (polymerization degree 20) lauric acid diester, and polyethylene glycol (polymerization degree 20) oleic acid diester); polyoxyalkylenealkyl phenyl ethers (the number of carbon atoms of the alkylene is 2 to 24 and the number of carbon atoms of the alkyl is 8 to 40) (e.g. nonyl phenol EO 4 mole adduct, nonyl phenol EO 8 mole-PO 20 mole block adduct, octyl phenol EO 10 mole adduct, bisphenol A-EO 10 mole adduct, and styrenated phenol EO 20 mole adduct); polyoxyalkylenealkyl aminoethers (the number of carbon atoms of the alkylene is 2 to 24 and the number of carbon atoms of the alkyl is 8 to 40) (e.g. laurylamine EO 10 mole adduct, and stearylamine EO 10 mole adduct); and polyoxyalkylenealkanol amides (the number of carbon atoms of the alkylene is 2 to 24 and the number of carbon atoms of the amido (acyl portion) is 8 to 24) (e.g. hydroxyethyl lauric acid amide EO 10 mole adduct, and hydroxypropyloleic acid amide EO 20 mole adduct).

Examples of the polyhydric alcohol type nonionic surfactants to be used may include polyhydric alcohol aliphatic acid esters, polyhydric alcohol aliphatic acid ester AO adducts, polyhydric alcohol alkyl ethers, and polyhydric alcohol alkyl ether AO adducts. The number of carbon atoms of the polyhydric alcohol is 3 to 24, the number of carbon atoms of the aliphatic acids is 8 to 40, and number of carbon atoms of the AO is 2 to 24.

Examples of the polyhydric alcohol aliphatic acid esters may include pentaerythritol monolaurate, pentaerythritol monooleate, sorbitan monolaurate, sorbitan monostearate, sorbitan dilaurate, sorbitan diolerate, and sucrose monostearate.

Examples of the polyhydric alcohol aliphatic acid ester AO adducts may include ethylene glycol monooleate EO 10 mole adduct, ethylene glycol monostearate EO 20 mole adduct, trimethylolpropane monostearate EO 20 mole-PO 10 mole random adduct, sorbitan monolaurate EO 10 mole adduct, sorbitan distearate EO 20 mole adduct, and sorbitan dilaurate EO 12 mole-PO 24 mole random adduct.

Examples of the polyhydric alcohol alkyl ethers may include pentaerythritol monobutyl ether, pentaerythritol monolauryl ether, sorbitan monomethyl ether, sorbitan monostearyl ether, methyl glycoside, and lauryl glycoside.

Examples of the polyhydric alcohol alkyl ether AO adducts may include sorbitan monostearyl ether EO 10 mole adduct, methyl glycoside EO 20 mole-PO 10 mole random adduct, lauryl glycoside EO 10 mole adduct, and stearyl glycoside EO 20 mole-PO 20 mole random adduct.

Examples of the water-soluble polymer (t) may include cellulose compounds (e.g. methyl cellulose, ethyl cellulose, hydroxyethyl cellulose, ethyl hydroxyethyl cellulose, carboxymethyl cellulose, hydroxypropyl cellulose, and their saponified compounds), gelatin, starch, dextrin, gum arabic, chitin, chitosan, polyvinyl alcohol, polyvinylpyrrolidone, polyethylene glycol, polyethyleneimine, polyacrylamide, acrylic acid (salt)-containing polymers (poly(sodium acrylate), poly(potassium acrylate), poly(ammonium acrylate), poly(acrylic acid) partially neutralized with sodium hydroxide, sodium acrylate-acrylic acid ester copolymer), styrene-maleic anhydride copolymers (partially) neutralized with sodium hydroxide, and water-soluble polyurethanes (e.g. reaction products of polyethylene glycol or polycaprolactone diol with polyisocyanate).

The solvent (u) used in the invention may be added to the aqueous medium at the time of emulsification dispersion, if necessary, or may be added to an object to be emulsified and dispersed (to oil phase (O) containing the resin (b) or (b0)).

Practical examples of the solvent (u) may be aromatic hydrocarbon solvents such as toluene, xylene, ethylbenzene, and tetralin; aliphatic or alicyclic hydrocarbon solvents such as n-hexane, n-heptane, mineral spirit, and cyclohexane; halogen solvents such as methyl chloride, methyl bromide, methyl iodide, methylene dichloride, tetrachloromethane, trichloroethylene, and perchloroethylene; ester or ester ether solvents such as ethyl acetate, butyl acetate, methoxybutyl acetate, methyl cellosolve, and ethyl cellosolve acetate; ether solvents such as diethyl ether, tetrahydrofuran, dioxane, ethyl cellosolve, butyl cellosolve acetate, and propylene glycol monomethyl ether; ketone solvents such as acetone, methyl ethyl ketone, methyl isobutyl ketone, di-n-butyl ketone, and cyclohexanone; alcohol solvents such as methanol, ethanol, n-propanol, isopropanol, n-butanol, isobutanol, tert-butanol, 2-ethylhexyl alcohol, and benzyl alcohol; amide solvents such as dimethylformamide, and dimethylacetamide; sulfoxide solvents such as dimethyl sulfoxide; heterocyclic compound solvents such as N-methylpyrrolidone, and solvent mixtures of two or more of the above-mentioned solvents.

The plasticizer (v) may be added to the aqueous medium at the time of emulsification dispersion, if necessary, or may be added to an object to be emulsified and dispersed (to oil phase (O) containing the resin (b) or (b0)).

The plasticizer (v) is not at all limited and the following can be exemplified:

(v1) phthalic acid esters (dibutyl phthalate, dioctyl phthalate, butyl benzyl phthalate, and diisodecyl phthalate);

(v2) aliphatic dibasic acid esters (di-2-ethylhexyl adipate and 2-ethylhexyl sebacate);

(v3) trimellitic acid esters (tri-2-ethylhexyl trimellitate and trioctyl trimellitate);

(v4) phosphoric acid esters (triethyl phosphate, tri-2-ethylhexyl phosphate, and tricresyl phosphate);

(v5) aliphatic acid esters (butyl oleate); and (v6) mixtures of two or more plasticizers exemplified above.

The particle diameter of the resin particles (A) in the invention is generally smaller than the particle diameter of the resin particles (B) and, in terms of the particle diameter evenness, the particle diameter ratio (volume average particle diameter of resin particles (A))/(volume average particle diameter of resin particles (B)) is preferable in a range of 0.001 to 0.3. The lower limit of the particle diameter ratio is more preferably 0.003 and the upper limit is more preferably 0.25. If the particle diameter ratio is larger than 0.3, (A) cannot be adsorbed on the surface of (B) and therefore, the particle size distributions of (C) and (D) to be obtained tend to become broad.

The volume average particle diameter of the resin particles (A) can be properly adjusted within the above-mentioned particle diameter ratio so that the particle diameter is suitable for obtaining the particle diameter (D) with a desired particle diameter.

In general, the volume average particle diameter of the resin particles (A) is preferably 0.0005 to 30 µm. The upper limit is more preferably 20 µm and even more preferably 10 µm and the lower limit is more preferably 0.01 µm, even more preferably 0.02 µm, and most preferably 0.04 µm. In the case the resin particles (D) with a volume average particle diameter of 1 µm are desired, it is preferably in a range of 0.0005 to 0.3 µm and more preferably in a range of 0.001 to 0.2 µm: in the case the resin particles (D) with 10 µm size are desired, it is preferably in a range of 0.005 to 3 µm and more preferably in a range of 0.05 to 2 µm: and in the case the resin particles (D) with 100 µm size are desired, it is preferably in a range of 0.05 to 30 µm and more preferably in a range of 0.1 to 20 µm.

The volume average particle diameter can be measured by laser type particle size distribution measurement apparatus LA-920 (manufactured by Horiba Ltd.) and Multi Sizer III (manufactured by Coulter), and ELS-800 (manufactured by Otsuka Electronics Co., Ltd.) employing laser Doppler method as optical system. If the measurement values of the particle diameters differ among the respective measurement apparatuses, the values measured by ELS-800 are employed.

In terms of easiness to obtain the particle diameter ratio, the volume average particle diameter of the resin particles (B) described somewhere below is preferably 0.1 to 300 µm, more preferably 0.5 to 250 µm, and even more preferably 1 to 200 µm.

Any conventionally known resin may be used as the resin (b) of the invention and specific examples of the resin (b) to be used are those exemplified for (a). The resin (b) may be properly selected in accordance with applications and purposes.

In general, the resin (b) may be preferably vinyl resins, polyester resins, polyurethane resins, epoxy resins, and their combinations, more preferably polyurethane resins and polyester resins, and even more preferably polyester resins and polyurethane resins containing 1,2-propylene glycol as a constituent unit.

Mn, melting point, Tg, and sp value of the resin (b) may be properly adjusted in preferable ranges in accordance with applications.

The sp value of the resin (b) is generally 7 to 18, preferably 8 to 14, and more preferably 9 to 14. In the case the resin particles (D) are used for resins for slush molding or powder coatings, Mn of (b) is generally 2,000 to 500,000 and preferably 4,000 to 200,000: the melting point of (b) (measured by DSC, hereinafter, the melting point is value measured by DSC) is generally 0° C. to 200° C. and preferably 35° C. to 150° C.: and Tg of (b) is generally −60° C. to 100° C. and preferably −30° C. to 60° C.

In the case of using the resin particles for spacers for electronic part such as liquid crystal displays or standard particles for electronic measurement apparatus, Mn of (b) is generally 20,000 to 10,000,000 and preferably 40,000 to 2,000,000: the melting point of (b) (measured by DSC, hereinafter, the melting point is value measured by DSC) is generally 40° C. to 300° C. and preferably 70° C. to 250° C.: and Tg of (b) is generally-0° C. to 250° C. and preferably 50° C. to 200° C.

In the case of using the resin particles for toners to be used for electrophotography, electrostatic recording, and electrostatic printing, Mn of (b) is generally 1,000 to 5,000,000 and preferably 2,000 to 500,000: the melting point of (b) (measured by DSC, hereinafter, the melting point is value measured by DSC) is generally 20° C. to 300° C. and preferably 80° C. to 250° C.: and Tg of (b) is generally 20° C. to 200° C. and preferably 40° C. to 200° C. The sp value of (b) is generally 8 to 16 and preferably 9 to 14.

In the production method of the second invention, a water-based dispersion (W) of resin particles (A) comprising a first resin (a) is mixed with a second resin (b) or its solvent solution (O1), and (O1) is dispersed in (W) for forming the resin particles (B) comprising (b) in the water-based dispersion (W) of (A) to thereby obtain a water-based dispersion of resin particles (C) having a structure formed by depositing the resin particles (A) or film (P) comprising the resin (a) on the surfaces of the resin particles (B) and thereafter, a portion of the resin particles (A) or the film (P) on the surfaces of the resin particles (B) is removed by separation and/or dissolution to obtain a water-based dispersion of resin particles (D).

Alternatively, a water-based dispersion (W) of resin particles (A) comprising the resin (a) is mixed with a precursor (b0) of the resin (b) or its solvent solution (O2), and (O2) is dispersed in (W) and further reaction of (b0) is caused for forming the resin particles (B) comprising (b) in the water-based dispersion (W) of (A) to obtain a water-based dispersion of resin particles (C) having a structure formed by depositing the resin particles (A) or film (P) comprising the resin (a) on the surfaces of the resin particles (B) and thereafter, a portion of the resin particles (A) or the film (P) on the surfaces of the resin particles (B) is removed by separation and/or dissolution to obtain a water-based dispersion of resin particles (D).

The attraction power of the resin particles (A) to the resin particles (B) for forming the resin particles (C) can be controlled by the following methods.

(1) At the time of producing the water-based dispersion (W), if the resin particles (A) and the resin particles (B) are controlled to have mutually opposed positive and negative electric charges, the attraction power is generated, in this case, as the electric charges of the resin particles (A) and the resin particles (B) are controlled to be higher, the attraction power is increased more to increase the coverage of the resin particles (A) on the resin particles (B).

(2) At the time of producing the water-based dispersion (W), if the resin particles (A) and the resin particles (B) are controlled to have electric charges with same polarity (both are positive or negative), the coverage tends to be decreased. In this case, generally a surfactant (s) and/or a water-soluble polymer (t) (particularly those having opposed electric charge to that of the resin particles (A) and the resin particles (B)) is used, the coverage is increased.

(3) At the time of producing the water-based dispersion (W), if the resin (a) is a resin having an acidic functional group such as carboxyl, phosphoric acid group, or sulfonic acid group (generally those having 1,000 or less molecular weight per one acidic functional group are preferable), the coverage is increased more as the pH of the aqueous medium is lower. Contrarily, if the pH is increased higher, the coverage is decreased more.

(4) At the time of producing the water-based dispersion (W), if the resin (a) is a resin having a basic functional group such as primary amino group, secondary amino group, tertiary amino group, or quaternary ammonium salt group (generally those having 1,000 or less molecular weight per one basic functional group are preferable), the coverage is increased more as the pH of the aqueous medium is higher. Contrarily, if the pH is decreased more, the coverage is decreased more.

(5) If Δsp values of the resin particles (A) and the resin particles (B) are lowered, the coverage is increased.

In the case the resin (b) or its solvent solution, or the precursor (b0) of the resin (b) or its solvent solution is dispersed, a dispersing apparatus may be employed.

A dispersing apparatus used in the invention is not particularly limited if it is commercialized generally as an emulsifying apparatus or a dispersing apparatus, and examples are batch type emulsifiers such as Homogenizer (manufactured by IKA), Polytron (manufactured by Kinematica), and TK Auto Homomixer (manufactured by Tokushu Kika Kogyo Co., Ltd.); continuous emulsifiers such as Ebara Milder (manufactured by Ebara Seisaku Sho), TK Fillmix, TK Pipeline Homomixer (manufactured by Tokushu Kika Kogyo Co., Ltd.), Colloid Mill (manufactured by Shinko Pantec Co., Ltd.), Slasher, Trigonal wet-type mill (manufactured by Mitsui Miike Machinery Co., Ltd.), Cavitron (manufactured by Eurotec Industries, Ltd.), and Fainfuromir (manufactured by Pacific Machinery & Engineering Co., Ltd.); high pressure emulsifiers such as Micro Fluidizer (manufactured by Mizuho Kogyo Co., Ltd.), Nanomizer (manufactured by Nanomizer), and APV Gourin (manufactured by Gourin); film emulsifiers such as film emulsifying apparatus (manufacture by Reika Co., Ltd.); vibration type emulsifiers such as Vibro Mixer (manufacture by Reika Co., Ltd.); and ultrasonic emulsifiers such as ultrasonic homogenizers (manufacture by Branson). In terms of evenness of particle diameter, APV Gourin, Homogenizer, TK Auto Homomixer, Ebara Milder, TK Fillmix, and TP Pipeline Homomixer are preferable among them.

At the time of dispersing the resin (b) in the water-based dispersion (W) of the resin particles (A), the resin (b) is preferable to be a liquid. In the case the resin (b) is a solid at room temperature, dispersion may be carried out in liquid state at a high temperature equal to or higher than the melting point or a solvent solution of (b) may be used.

The viscosity of the resin (b) or its solvent solution, or the precursor (b0) or its solvent solution is generally 10 to 50,000 mPa·s (measured by B type viscometer) and preferably 100 to 10,000 mPa·s in terms of particle diameter evenness. The temperature at the time of dispersion is generally 0 to 150° C. (under pressure) and preferably 5 to 98° C. In the case the viscosity of the dispersion is high, it is preferable to lower the viscosity to a preferable range by increasing the temperature and carry out the emulsification and dispersion.

A solvent used for the solvent solutions of the resin (b) and the precursor (b0) is not particularly limited if it is suitable for dissolving the resin (b) at room temperature or under heating condition, and specific examples are those same as exemplified for the solvent (u). Although depending on the type of the resin (b), preferable examples are solvents having 3 or lower of sp value difference from that of (b). In terms of the particle diameter evenness of the resin particles (C) and the resin particles (D), solvents which dissolve the resin (b) but hardly dissolve or swell the resin particles (A) comprising the resin (a) are preferable.

The precursor (b0) of the resin (b) is not particularly limited if it can be converted into the resin (b) by chemical reaction, and in the case the resin (b) is a condensed resin (e.g. polyurethane resins, epoxy resins, and polyester resins), (b0) may be a combination of a prepolymer (α) having a reactive group and a curing agent (β): in the case the resin (b) is a vinyl resin, (b0) may be the above-mentioned vinyl monomers (used alone or mixture) and their solvent solutions.

In the case a vinyl monomer is used as the precursor (b0), a method for causing reaction of the precursor (b0) to obtain the resin (b) may be, for example, a method (so-called suspension polymerization method) involving dispersing and suspending an oil phase containing an oil-soluble initiator, monomers, and if necessary, a solvent (u) in water in the presence of a water-soluble polymer (t) and causing radical polymerization reaction by heating; and a method (so-called emulsion polymerization method) involving emulsifying an oil phase containing monomers and if necessary, a solvent (u) in a water-based dispersion (W) of resin particles (A) containing a water-soluble initiator and causing radical polymerization reaction by heating.

As the precursor (b0), a combination of a prepolymer ($\alpha$) having a reactive group and a curing agent ($\beta$) may be also employed. Herein, the term "reactive group" means group reactive with the curing agent ($\beta$). In this case, a method for forming the resin (b) by reaction of the precursor (b0) may be a method involving dispersing an oil phase containing the reactive group-containing prepolymer ($\alpha$), the curing agent ($\beta$), and if necessary, the solvent (u) in a water-based dispersion of resin particles (A) and causing reaction of the reactive group-containing prepolymer ($\alpha$) and the curing agent ($\beta$) by heating to form resin particles (B) comprising the resin (b); and a method involving dispersing the reactive group-containing prepolymer ($\alpha$) or its solvent solution in a water-based dispersion of the resin particles (A), adding the water-soluble curing agent ($\beta$) thereto, and causing reaction of the curing agent ($\beta$) to form the resin particles (B) comprising the resin (b): and in the case the reactive group-containing prepolymer ($\alpha$) is cured by reaction with water, a method involving dispersing the reactive group-containing prepolymer ($\alpha$) or its solvent solution in the water-based dispersion (W) of the resin particles (A) and causing reaction with water to form the resin particles (B) comprising (b) can be exemplified.

A combination of the reactive group of the reactive group-containing prepolymer ($\alpha$) and the curing agent ($\beta$) may include the following (1) and (2).

(1) A combination of a reactive group-containing prepolymer ($\alpha$) of which the reactive group is a functional group ($\alpha1$) reactive with an active hydrogen compound and a curing agent ($\beta$) which is an active hydrogen-containing compound ($\beta1$).

(2) A combination of a reactive group-containing prepolymer ($\alpha$) of which the reactive group is an active hydrogen-containing group ($\alpha2$) and a curing agent ($\beta$) which is a compound ($\beta2$) reactive with the active hydrogen-containing group.

In terms of the reactivity in water, (1) is more preferable between them.

In the above-mentioned combination (1), the functional group ($\alpha1$) reactive with an active hydrogen compound may include an isocyanato group ($\alpha1a$), a blocked isocyanato group ($\alpha1b$), an epoxy group ($\alpha1c$), acid anhydride group (aid), and acid halide group ($\alpha1e$). Preferable examples among them are ($\alpha1a$), ($\alpha1b$) and ($\alpha1c$), and more preferable examples are ($\alpha1a$) and ($\alpha1b$).

The blocked isocyanato group ($\alpha1b$) means isocyanato group blocked with a blocking agent.

The above-mentioned blocking agent may be oximes (acetoxime, methyl isobutyl ketoxime, diethyl ketoxime, cyclopentanone oxime, cyclohexanone oxime, and methyl ethyl ketoxime); lactams ($\gamma$-butyrolactam, $\epsilon$-caprolactam, and $\gamma$-valerolactam); aliphatic alcohols having 1 to 20 carbon atom(s) (ethanol, methanol, and octanol); phenols (phenol, m-cresol, xylenol, and nonylphenol); active methylene compounds (acetyl acetone, ethyl malonate, and ethyl acetoacetate); basic nitrogen-containing compounds (N,N-diethylhydroxylamine, 2-hdyroxypyridine, pyridine N-oxide, and 2-mercaptopyridine); and mixtures of two or more of these compounds.

Those preferable among them are oximes and a particularly preferable compound is methyl ethyl ketoxime.

The skeleton of the reactive group-containing prepolymer ($\alpha$) may include a polyether ($\alpha w$), a polyester ($\alpha x$), an epoxy resin ($\alpha y$), and a polyurethane ($\alpha z$). Those preferable among them are ($\alpha x$), ($\alpha y$), and ($\alpha z$), and those particularly preferable are ($\alpha x$) and ($\alpha z$).

Examples of the polyether ($\alpha w$) are polyethylene oxide, polypropylene oxide, polybutylene oxide, and polytetramethylene oxide.

Examples of the polyester ($\alpha x$) are polycondensation products of diols (11) and dicarboxylic acids (13) and polycaprolactone (ring-opening polymer of $\epsilon$-caprolactone).

Examples of the epoxy resin ($\alpha y$) are addition condensates of bisphenols (bisphenol A, bisphenol F, and bisphenol S) and epichlorohydrin.

Examples of the polyurethanes ($\alpha z$) are polyaddition products of diols (11) and polyisocyanates (15) and polyaddition products of polyesters ($\alpha x$) and polyisocyanates (15).

A method for introducing the reactive group to the polyester ($\alpha x$), epoxy resin ($\alpha y$), and polyurethane ($\alpha z$) may be the following.

(1) A method for leaving functional groups of a constituent component in terminals by using an excess amount of one constituent component among two or more constituent components.

(2) A method for leaving functional groups of a constituent component in terminals by using an excess amount of one constituent component among two or more constituent components and causing reaction of the remaining functional groups with a compound having a reactive group reactive with the remaining functional groups and a functional group.

In the case of the method (1), polymers to be obtained are hydroxyl group-containing polyester prepolymers, carboxyl group-containing polyester prepolymers, acid halide group-containing polyester prepolymers, hydroxyl group-containing epoxy prepolymers, epoxy group-containing epoxy prepolymers, hydroxyl group-containing urethane prepolymers, and isocyanato group-containing urethane prepolymers.

With respect to the ratio of the constituent components, for instance, in the case of the hydroxyl group-containing polyester prepolymers, the ratio of the polyols (1) and polycarboxylic acids (2) as equivalent ratio [OH]/[COOH] of hydroxyl [OH] and carboxyl [COOH] is generally 2/1 to 1/1, preferably 1.5/1 to 1/1, and more preferably 1.3/1 to 1.02/1. In the case of prepolymers having other skeleton structures and terminal groups, the ratio is the same while the constituent components alone are changed.

In the above-mentioned method (2), isocyanto group-containing prepolymers are obtained by reaction of polyisocyanates with the prepolymers obtained in the above-mentioned method (1); blocked polyisocyanto group-containing prepolymers are obtained by reaction of blocked polyisocyanates; epoxy group-containing prepolymers are obtained by reaction of polyepoxides; and acid anhydride group-containing prepolymers are obtained by reaction of poly(acid anhydride).

With respect to the use amount of a compound having a functional group and a reactive group, for instance, in the case of obtaining the isocyanato group-containing polyester prepolymers by reaction of polyisocyanates with hydroxyl group-containing polyesters, the ratio of the polyisocyanates as equivalent ratio [NCO]/[OH] of isocyanato group [NCO]

and hydroxyl [OH] of the hydroxyl-containing polyesters is generally 5/1 to 1/1, preferably 4/1 to 1.2/1, and more preferably 2.5/1 to 1.5/1. In the case of prepolymers having other skeleton structures and terminal groups, the ratio is the same while the constituent components alone are changed.

The number of the reactive group introduced into the reactive group-containing prepolymers ($\alpha$) per one molecule is generally one or more, preferably an average of 1.5 to 3, and more preferably an average of 1.8 to 2.5. The molecular weight of cured products obtained by reaction with a curing agent ($\beta$) is increased by adjusting the number within the above-mentioned range.

Mn of the reactive group-containing prepolymers ($\alpha$) is generally 500 to 30,000, preferably 1,000 to 20,000, and more preferably 2,000 to 10,000.

The weight average molecular weight of the reactive group-containing prepolymers ($\alpha$) is generally 1,000 to 50,000, preferably 2,000 to 40,000, and more preferably 4,000 to 20,000.

The viscosity of the reactive group-containing prepolymers ($\alpha$) is generally 2,000 or lower poise and preferably 1,000 or lower poise at 100° C. It is preferable to adjust the viscosity to be 2,000 or lower poise since resin particles (C) and (D) in sharp particle diameter distribution can be obtained with a small amount of a solvent.

Examples of the active hydrogen-containing compound ($\beta1$) may include a polyamine ($\beta1a$) which may be blocked with a dissociable compound, a polyol ($\beta1b$), a polymercaptan ($\beta1c$), and water ($\beta1d$). Those preferable among them are ($\beta1a$), ($\beta1b$), and ($\beta1d$); more preferable are ($\beta1a$) and ($\beta1d$); and even more preferable are blocked polyamines and ($\beta1d$).

Examples of ($\beta1a$) are those same as exemplified for the polyamines (16). Preferable compounds of ($\beta1a$) are 4,4'-diaminodiphenylmethane, xylylenediamine, isophoronediamine, ethylenediamine, diethylenetriamine, triethylenetetramine and their mixtures.

In the case ($\beta1a$) is a polyamine blocked with a dissociable compound, examples of ($\beta1a$) are ketimine compounds obtained by reaction of the above-mentioned polyamines and ketones having 3 to 8 carbon atoms (such as acetone, methyl ethyl ketone, and methyl isobutyl ketone), aldimine compounds derived from aldehyde compounds having 2 to 8 carbon atoms (formaldehyde and acetaldehyde), enamine compounds, and oxazolidine compounds.

Examples of the polyol ($\beta1b$) are those same as exemplified for the above-mentioned diols (11) and polyols (12). Diols (11) alone or mixtures of diols (11) and small amounts of polyols (12) is preferable.

Examples of the polymercaptan ($\beta1c$) may be ethylenedithiol, 1,4-butanedithiol, and 1,6-hexaneditiol.

If necessary, a reaction stopping agent ($\beta s$) may be employed in combination with the active hydrogen-containing compound ($\beta1$). Use of a reaction stopping agent in combination with a prescribed ratio of ($\beta1$) makes it possible to adjust (b) to have a prescribed molecular weight.

Examples of the reaction stopping agent ($\beta s$) may be monoamines (such as diethylamine, dibutylamine, butylamine, laurylamine, monoethanolamine, and diethanolamine); blocked monoamines (such as ketimine compounds); monools (such as methanol, ethanol, isopropanol, butanol, and phenol); monomercaptans (such as butyl mercaptan and lauryl mercaptan); monoisocyanates (such as lauryl isocyanate and phenyl isocyanate); and monoepoxides (such as butyl glycidyl ethers).

Examples of the active hydrogen-containing group ($\alpha2$) which the reactive group-containing prepolymer ($\alpha$) in the above-mentioned combination (2) may include an amino group ($\alpha2a$), a hydroxyl group (alcoholic hydroxyl and phenolic hydroxyl) ($\alpha2b$), a mercapto group ($\alpha2c$), a carboxyl group ($\alpha2d$), and an organic group ($\alpha2e$) obtained by blocking these groups with a dissociable compound. Those preferable among them are ($\alpha2a$), ($\alpha2b$), and an organic group ($\alpha2e$) obtained by blocking an amino group with a dissociable compound.

Examples of the organic group obtained by blocking an amino group with a dissociable compound are those same as exemplified for ($\beta1a$).

Examples of the compound ($\beta2$) reactive with the active hydrogen-containing group may include a polyisocyanate ($\beta2a$), a polyepoxide ($\beta2b$), a polycarboxylic acid ($\beta2c$), a polycarboxylic anhydride ($\beta2d$), and a polyacid halide ($\beta2e$). Those preferable among them are ($\beta2a$) and ($\beta2b$) and more preferable are ($\beta2a$).

Examples of the polyisocyanate ($\beta2a$) are those same as exemplified for the polyisocyanates (15) and the preferred examples are the same.

Examples of the polyepoxide ($\beta2b$) are those same as exemplified for the polyepoxides (19) and the preferred examples are the same.

Examples of the polycarboxylic acid ($\beta2c$) are a dicarboxylic acid ($\beta2c$-1) and a tri- or higher-polycarboxylic acid ($\beta2c$-2) and preferably ($\beta2c$-1) alone or mixture of ($\beta2c$-1) and a small amount of ($\beta2c$-2).

Examples of the dicarboxylic acid ($\beta2c$-1) are those same as exemplified for the above-mentioned dicarboxylic acids (13) and examples of the polycarboxylic acid are those same as exemplified for the above-mentioned polycarboxylic acids (5) and preferable examples are the same.

Examples of the polycarboxylic acid anhydride ($\beta2d$) may include pyromellitic acid anhydride. Examples of the polyacid halide ($\beta2e$) are acid halides of the ($\beta2c$) (acid chloride, acid bromide, and acid iodide).

Further, if necessary, a reaction stopping agent ($\beta s$) may be used in combination with ($\beta2$).

With respect to the ratio of the curing agent ($\beta$), the ratio [a]/[$\beta$] of the equivalent amount [$\alpha$] of the reactive group in the reactive group-containing prepolymer ($\alpha$) and the equivalent amount [$\beta$] of the reactive hydrogen-containing group in the curing agent ($\beta$) is generally 1/2 to 2/1, preferably 1.5/1 to 1/1.5, and more preferably 1.2/1 to 1/1.2. In the case the curing agent ($\beta$) is water ($\beta1d$), water is regarded as a divalent active hydrogen compound.

The resin (b) obtained by reaction of the precursor (b0) consisting of the reactive group-containing prepolymer ($\alpha$) and the curing agent ($\beta$) in an aqueous medium becomes the resin particles (B) and constituent components of the resin particles (C) and (D). The weight average molecular weight of the resin (b) obtained by reaction of the reactive group-containing prepolymer ($\alpha$) and the curing agent ($\beta$) is generally 3,000 or higher, preferably 3,000 to 10,000,000, and more preferably 5,000 to 1,000,000.

Further, at the time of reaction of the reactive group-containing prepolymer ($\alpha$) and the curing agent ($\beta$) in an aqueous medium, a polymer (so-called dead polymer) which does not react with the reactive group-containing prepolymer ($\alpha$) and the curing agent ($\beta$) may be added in the reaction system. In this case, (b) becomes a mixture of the resin obtained by reaction of the reactive group-containing prepolymer ($\alpha$) and the curing agent ($\beta$) in the aqueous medium and the resin which is not reacted.

The use amount of the water-based dispersion (W) to 100 parts by weight of the resin (b) or the precursor (b0) is preferably 50 to 2,000 parts by weight and more preferably 100 to 1,000 parts by weight. If it is 50 parts by weight or higher, the dispersion state of (b) becomes good and if it is 2,000 parts by weight or lower, it is economical.

In the production method of the second invention, particularly in the case of using solvent solution of (b) or (b0) (particularly the following preferable solvent), use of the resin (a) having the prescribed initial softening temperature, glass transition temperature, flow temperature, and the difference of the glass transition temperature and flow temperature often makes it possible to dissolve the resin particles (A) in a solvent and makes them a film-like form and obtain a water-based resin dispersion of the resin particles (C) consisting of the film (P) comprising the resin (a) on the surfaces of (B) by using the solvent in an amount of 10 to 50% (particularly preferably 20 to 40%) in the water-based resin dispersion and desolvation to 1% or less (particularly 0.5% or less) at 40° C.

Examples of the above-mentioned solvent are preferably those having high affinity to (b), and specific examples are those same as exemplified for the above-mentioned solvent (u). Those preferable among the solvents (u) are, in view of coating formation, tetrahydrofuran, toluene, acetone, methyl ethyl ketone, and ethyl acetate, and ethyl acetone is more preferable.

With respect to control of the shape of the resin particles (D) to be obtained by the production method of the second invention, the particle shapes and particle surface properties can be controlled by controlling the sp value difference of the resin particles (A) and the resin particles (B) or controlling the molecular weight of the resin particles (A). If the sp value difference is small, particles with irregular shape and smooth surface tend to be obtained easily, and if the sp value difference is large, particles with spherical shape and roughened surface tend to be obtained easily. Further, if the molecular weight of (A) is high, particles with roughened surface tend to be obtained easily, and if the molecular weight is low, particles with smooth surface tend to be obtained easily. In this regard, if the sp value difference of (A) and (B) is too high or low, granulation becomes difficult. Further, if the molecular weight of (A) is too low, granulation becomes difficult. Therefore, the sp value difference of (A) and (B) is preferably 0.01 to 5.0, more preferably 0.1 to 3.0, and even more preferably 0.2 to 2.0. The weight average molecular weight of the resin particles (A) is preferably 100 to 1,000,000, more preferably 1,000 to 500,000, furthermore preferably 2,000 to 200,000, and even more preferably 3,000 to 100,000.

In the production method of the second invention, in terms of the particle diameter evenness of the resin particles (C) and (D), and storage stability of the resin particles (D), the resin particles (C) which are intermediates preferably consist of 0.01 to 60% of the resin particles (A) or the film (P) comprising the resin (a) and 40 to 99.99% of (B), more preferably 0.1 to 50% of the resin particles (A) or (P) and 50 to 99.9% of (B), and even more preferably 1 to 45% of (A) or (P) and 55 to 99% of (B).

Further, in terms of the particle diameter evenness of the resin particles (C) and (D), and powder flowability and storage stability of the resin particles (D), with respect to the resin particles (C), not less than 5%, preferably not less than 30%, more preferably not less than 50%, and even more preferably not less than 80% of the surfaces of the resin particles (B) are covered with the resin particles (A) or the film (P) comprising the resin (a). The surface coverage of (C) can be calculated by image analysis of an image obtained by scanning electron microscope (SEM) of the resin particles obtained by removing the aqueous medium by a method same as the method for removing the aqueous medium from the water-based resin dispersion of (D) described below, according to the following equation.

Surface coverage (%)=(surface area of portions covered with resin particles (A) or film (P))/(surface area of portion covered with resin particles (A) or film (P)+surface area of exposed portions of resin particles (B))×100

In terms of the particle diameter evenness and powder flowability of the resin particles (D), the amount of the resin particles (A) or the film (P) comprising the resin (a) is preferably 0.1 to 5%, more preferably 0.12 to 3%, furthermore preferably 0.15 to 1%, and even more preferably 0.2 to 0.9% based on the weight of (D). The amount of (A) or (P) can be calculated from the amount of heat of fusion measured by DSC according to the following equation.

Amount (%) of resin particles (A) or film (P)=(amount of heat of fusion of (A) or (P))/(amount of heat of fusion of (A) or (P)+amount of heat of fusion of resin particles (B))×100

In terms of the particle diameter evenness and powder flowability of the resin particles (D), with respect to the resin particles (D) of the first invention, the surface coverage of the resin particles (B) with the resin particles (A) or the film (P) comprising the resin (a) is generally 0.1 to 4.9%, preferably 0.1 to 4%, more preferably 0.12 to 3%, furthermore preferably 0.15 to 1%, and even more preferably 0.2 to 0.9%. In this connection, the surface coverage is calculated according to the above-mentioned equation by image analysis of an image obtained by a scanning electron microscope (SEM).

A method for adjusting the surface coverage with (A) or (P) within the above-mentioned range may be carried out by repeating the above-mentioned operation of separation removal and/or dissolution removal of the resin particles (A) or the film (P) comprising the resin (a) in the case resin particles with a coverage higher than a desired coverage are obtained. Further, in the case resin particles with a coverage of 0% or lower than a desired coverage are obtained, a small amount of the water-based dispersion (W) containing the resin particles (A) comprising the resin (a) may be added to deposit the resin particles (A) on the surface of the resin particles.

In terms of the particle diameter evenness, the variation coefficient of the volume distribution of the resin particles (C) and (D) is preferably not higher than 30% and more preferably 0.1 to 15%.

Further, in terms of the particle diameter evenness, the value of the ratio: (volume average particle diameter/number average particle diameter) of the resin particles (C) and (D) is preferably 1.0 to 1.4 and more preferably 1.0 to 1.2.

Although it depends on applications, the volume average particle diameter of (D) is, in general, preferably 0.1 to 300 μm. The upper limit is further preferably 250 μm and even more preferably 200 μm. The lower limit is further preferably 0.5 μm and even more preferably 1 μm.

The volume average particle diameter and the number average particle diameter can be measured simultaneously by Multi Sizer III (manufactured by Coulter).

The resin particles (D) of the invention can have desired unevenness of particle surfaces by changing the particle diameter of the resin particles (A) and resin particles (B), and the surface coverage of the resin particles (B) with the resin particles (A) or film (P) comprising the resin (a). In the case the powder flowability is improved, the BET specific surface area of (D) is preferably 0.5 to 5.0 m$^2$/g. The BET specific surface area in this invention is measured using a specific surface area measurement meter, for instance, QUANTA- SORB (manufactured by Uasa Ionics, Ltd.) (measurement gas: He/Kr=99.9/0.1 vol. %, standard gas: nitrogen).

Similarly, in terms of the powder flowability, the centerline average surface roughness Ra of (D) is preferably 0.01 to 0.8 µm. Ra is a value calculated by arithmetically averaging the absolute values of the deviations of the roughness curve from the centerline thereof and can be measured by, for instance, a scanning type probe microscope system (manufactured by Toyo Technica).

The shapes of the resin particles (D) are preferably spherical in terms of the powder flowability and melt leveling properties. In this case, if the film (P) comprising the resin (a) is deposited to the resin particles (B) is, and (B) is spherical, or if the resin particles (A) is deposited to the (B), then both (A) and (B) are preferable spherical. The average degree of circularity of (D) is preferably 0.95 to 1.00. The average degree of circularity is preferably 0.96 to 1.0 and more preferably 0.97 to 1.00. The average degree of circularity is a value calculated by optically detecting particles and dividing by the circumferential lengths of the corresponding circle with equivalent projected surface area. Specifically, the measurement is carried out using a flow type particle image analysis apparatus (FPIA-2000, manufactured by SYSMEX Corporation). A prescribed container is loaded with 100 to 150 ml of water from which solid impurities are previously removed and with 0.1 to 0.5 ml of a surfactant as a dispersant (Dry Well, manufactured by Fuji Photo Film Co., Ltd.) and further about 0.1 to 9.5 g of a measurement sample is added. The suspension obtained by dispersing the sample is further dispersed for about 1 to 3 minutes by an ultrasonic dispersion apparatus (Ultrasonic Cleaner Model VS-150, manufactured by Velvo-Clear) to adjust the dispersion concentration of 3,000 to 10,000 particles/µL, and the shape and distribution of the resin particles are measured.

The resin particles (D) obtained by the production method of the second invention are preferably the resin particles (B) bearing the film (P), however, in the case of the resin particles (B) bearing the resin particles (A), the particle surfaces can be made smooth or the particle surfaces may be provided with desired unevenness by changing the particle diameter ratio of the resin particles (A) to the resin particles (B), the surface coverage of the resin particles (B) with the resin particles (A) in the water-based resin dispersion, and the depth in which the resin particles (A) buried in the resin particle (B) in the interfaces of the resin particles (B)/the aqueous medium in the water-based resin dispersion.

The surface coverage of the resin particles (B) with the resin particles (A) and the depth in which the resin particles (A) buried in the resin particle (B) can be controlled by the following methods.

(1) At the time of producing the water-based resin dispersion containing the resin particles (C), if the resin particles (A) and the resin particles (B) are controlled to have mutually opposed positive and negative electric charges, the coverage and the depth are increased. In this case, if the respective electric charges of the resin particles (A) and resin particles (B) are increased, the coverage and the depth are increased.

(2) At the time of producing the water-based resin dispersion containing the resin particles (C), if the resin particles (A) and the resin particles (B) are controlled to have electric charges with same polarity (both are positive or negative), the coverage tends to be decreased and the depth tends to become shallow. In this case, generally a surfactant (s) and/or a water-soluble polymer (t) (particularly those having opposed electric charge to that of the resin particles (A) and the resin particles (B)) is used, the coverage is increased. Further, in the case of using the water-soluble polymer (t), as the molecular weight of the water-soluble polymer (t) is higher, the depth becomes shallow.

(3) At the time of producing the water-based resin dispersion containing the resin particles (C), if the resin (a) is a resin having an acidic functional group such as carboxyl, phosphoric acid group, or sulfonic acid group (generally that having 1,000 or less molecular weight per one acidic functional group is preferable), the coverage and the depth are increased as the pH of the aqueous medium is lower. Contrarily, if the pH is increased, the coverage and the depth are decreased.

(4) At the time of producing the water-based resin dispersion containing the resin particles (C), if the resin (a) is a resin having a basic functional group such as primary amino group, secondary amino group, tertiary amino group, or quaternary ammonium salt group (generally that having 1,000 or less molecular weight per one basic functional group is preferable), the coverage and the depth are increased as the pH of the aqueous medium is higher. Contrarily, if the pH is decreased, the coverage and the depth are decreased.

(5) If sp value difference of the resin (a) and the resin (b) is lowered, the coverage and the depth are increased.

In the production method of the second invention, the water-based dispersion of the resin particles (D) is obtained by separating the resin particles (A) or the film (P) comprising the resin (a) from the resin particles (B), and successively removing the resin particles (A) or the film (P) from the water-based dispersion (W), or by dissolving the resin particles (A) or the film (P) in the water-based dispersion (W) without dissolving the resin particles (B). The dissolved matter of the resin particles (A) or the film (P) may be separated and removed, if necessary. Further, the aqueous medium is removed from the water-based dispersion of the resin particles (D) to obtain the resin particles (D).

IN the water-based dispersion of the resin particles (C), a method for separating the resin particles (A) or the film (P) comprising the resin (a) from the resin particles (B) may be the following methods.

(1) A method of treating the water-based dispersion of the resin particles (C) with ultrasonic wave.

(2) A method of diluting the water-based dispersion of the resin particles (C) with a large quantity of water or a water-soluble organic solvent such as methanol, ethanol, or acetone and applying shearing force by stirring.

(3) A method of adding an acid, alkali, or inorganic salt to the water-based dispersion of the resin particles (C) and applying shearing force by stirring.

(4) A method of heating the water-based dispersion of the resin particles (C) and applying shearing force by stirring.

(5) A method of carrying out desolvation in the case the water-based dispersion of the resin particles (C) contain a solvent (in the case the solvent solution of the resin (a) and/or the solvent solution of the resin (b) is dispersed in the aqueous medium or in the case a solvent is dissolved in the aqueous medium).

A method for dissolving the resin particles (A) or the film (P) in the water-based dispersion may be the following methods.

(1) A method of adding an alkali such as sodium hydroxide, potassium hydroxide, ammonia, and DBU, and their aqueous solutions to the water-based dispersion in the case the resin (a) is a resin having an acidic functional group such as carboxyl group, phosphoric acid group, or sulfonic acid group (generally that having 1,000 or less molecular weight per one acidic functional group is preferable).

(2) A method of adding an acid such as hydrochloric acid, sulfuric acid, phosphoric acid, and acetic acid, and their aqueous solutions to the water-based dispersion in the case the resin (a) is a resin having a basic functional group such as primary amino group, secondary amino group, tertiary amino group, or quaternary ammonium salt group (generally that having 1,000 or less molecular weight per one basic functional group is preferable).

(3) A method of adding a specified solvent (U) in the water-based dispersion in the case the resin (a) is dissolved in the specified solvent (U) (in general, the sp value difference of the resin (a) and the solvent (U) is preferably 2.5 or lower).

A method for removing the resin particles (A) or the film (P) is preferably a method of dissolving the resin particles; more preferably a method of adding an alkali or its aqueous solution to the resin having an acidic functional group and a method adding an acid or its aqueous solution to the resin having a basic functional group; and even more preferably a method of adding an alkali or its aqueous solution to the resin having an acidic functional group. In addition, if the removal process is carried out an excess extent for completely removing the resin particles (A) or the film (P), the surfaces of the resin particles (D) are deteriorated to result in inferiority of fixing and electrostatic properties. Accordingly, it is preferable to remove the resin particles (A) or the film (P) from the surfaces of the resin particles (B) in condition of leaving 0.1% or more of (A) or (P) on the surface of the resin particles (B).

A method for separating and removing the resin particles (A) or the film (P), or their dissolved matter from the water-based dispersion may be methods as follows.

(1) A method for separating only the resin particles (B) by filtration with filter paper, filter cloth, mesh, or the like having prescribed meshes.

(2) A method of precipitating only the resin particles (B) by centrifugation and then removing the resin particles (A) or the film (P), or their dissolved matter contained in the supernatant.

A method for removing the aqueous medium from the water-based resin dispersion of the resin particles (D) may be the following methods.

(1) A method of drying the water-based resin dispersion under reduced or normal pressure.

(2) A method of carrying out solid-liquid separation by a centrifuge, a spacular filter, a filter press, or the like and drying the obtained powder.

(3) A method of freezing the water-based resin dispersion and drying (so-called freeze dry).

In the above-mentioned methods (1) and (2), at the time of drying the obtained powder, conventionally known facilities such as a fluidized bed type drying apparatus, a vacuum drying apparatus, and a circulation drying apparatus can be employed.

Further, if necessary, classification may be carried out using a blowing classifier to adjust the particle size distribution in a prescribed range.

The resin particles (A) or film (P) and/or (B) composing the resin particles (D) may be mixed with additives (pigments, fillers, antistatic agents, coloring agents, releasing agents, charge controlling agents, UV absorbents, antioxidants, blocking prevention agents, heat stabilizers, and flame retardants). A method for adding additives to (A) or film (P), or (B) may be carried out by adding them at the time of forming the water-based resin dispersion containing the resin particles (C) in an aqueous medium, however, it is more preferably carried out by mixing the additives with the resin (a) or the resin (b), and then adding and dispersing the mixture in the aqueous medium.

Further, in the invention, the additives are not necessarily added at the time of forming particles in the aqueous medium and may be added after particle formation. For instance, after particles containing no coloring agent are formed, a coloring agent may be added by a conventionally know dyeing method or the additives may be impregnated together with a solvent (u) and/or a plasticizer (v).

Further, as additives, a wax (c) and a modified wax (d) grafted with vinyl polymer chains are added together with the resin (b) to the resin particles (B), the thermal resistant storage stability is more improved and therefore it is preferable.

The content of (c) in (B) is preferably 20% or less and more preferably 1 to 15%. The content of (d) is preferably 10% or less and more preferably 0.5 to 8%. The total content of (c) and (d) is preferably 25% or less and more preferably 1 to 20%.

The wax (c) is dispersed in the resin (b) after melting and kneading treatment in absence of a solvent and/or heating, dissolving, and mixing treatment in presence of the solvent (u) together with the modified wax (d).

Examples of the wax (c) may include polyolefin waxes, paraffin waxes, carbonyl group-containing waxes, and their mixtures. Among them, paraffin waxes (c1) are particularly preferable. Examples of (c1) are petroleum waxes containing straight chain saturated hydrocarbons having 20 to 36 carbon atoms and a melting point of 50 to 90° C. as main components.

In terms of the releasing property, Mn of (c) is preferably 400 to 5000, more preferably 1000 to 3000, and even more preferably 1500 to 2000. In this connection, in descriptions above and below, Mn is measured using GPC (solvent: o-dichlorobenzene, standard substance: polystyrenes).

The wax (c) is preferable to be dispersed in the resin (b) after melting and kneading treatment in absence of a solvent and/or heating, dissolving, and mixing treatment in the presence of the above-mentioned solvent (u) together with the modified wax (d) grafted with vinyl polymer chains. According to the method, since the modified wax (d) coexists at the time of wax dispersion treatment, the wax portions of (d) are efficiently adsorbed on the surface of (c) or partially entwisted in the matrix structure of the wax, so that the affinity of the surface of wax (c) and the resin (b) is improved and (c) can be more evenly enclosed in the resin particles (B) to make control of the dispersion state easy.

The modified wax (d) is obtained by grafting a vinyl polymer chain to a wax. Examples of the wax (d) to be used are those same as exemplified for the above-mentioned wax (c) and the preferable examples are also same. Vinyl monomers for composing the vinyl polymer chains of (d) may be same as monomers (1) to (10) composing the above-mentioned vinyl resins and particularly preferable examples are (1), (2), and (6). The vinyl polymer chains may be homopolymers or copolymers of vinyl monomers.

The amount of the wax components in the modified wax (d) (including the un-reacted wax) is preferably 0.5 to 99.5%, more preferably 1 to 80%, furthermore preferably 5 to 50%, and even more preferably 10 to 30%. In terms of the thermal resistant storage stability of the resin particles (D), Tg of (d) is preferably 40 to 90° C. and more preferably 50 to 80° C.

Mn of (d) is preferably 1500 to 10000 and more preferably 1800 to 9000. If Mn is within a range of 1500 to 10000, the mechanical strength of the resin particles (D) is good.

The modified wax (d) is obtained, for instance, by dissolving or dispersing the wax (c) in a solvent (e.g. toluene or xylene), heating to 100 to 200° C., dropwise adding a vinyl monomer together with a peroxide initiator (such as benzoyl peroxide, di-tert-butyl peroxide, and tert-butyl peroxide benzoate), carrying out polymerization, and then removing the solvent by distillation.

The amount of the peroxide initiator in the synthesis of the modified wax (d) is preferably 0.2 to 10% and more preferably 0.5 to 5% based on the total weight of the raw materials of (d).

Examples of the peroxide polymerization initiator to be used may be oil-soluble peroxide polymerization initiators and water-soluble peroxide polymerization initiators.

Specific Examples of these initiators are those described above.

A method for mixing the wax (c) and the modified wax (d) may be the following methods: (1) a method of melting and kneading them at a temperature equal to or higher than the melting points of these waxes; (2) a method of dissolving or suspending (c) and (d) in a solvent (u) and thereafter precipitating by cooling precipitation or solvent precipitation in the solution or by spray drying in air; and (3) a method of dissolving or suspending (c) and (d) in a solvent (u) and thereafter carrying out mechanically wet pulverization by a dispersing apparatus. Among these methods, the method (2) is preferable.

A method for dispersing the wax (c) and the modified wax (d) in (b) may include a method of producing solvent solutions or dispersions of (c), (d), and (b) and then mixing them.

EXAMPLES

Hereinafter, the invention will be described more in detail with reference to Examples; however, it is not intended that the invention is limited to the illustrated Examples. In the following description, "part" means parts by weight.

Production Example 1

Production of Water-Based Dispersion of Resin Particles (A)

A reaction container equipped with a stirring rod and a thermometer was loaded with 130 parts of isopropanol, and a mixed solution containing 31 parts of butyl acrylate, 153 parts of vinyl acetate, 122 parts of methacrylic acid, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W1). The volume average particle diameters of (fine particle dispersion W1) measured by LA-920 and ELS-800 were both 0.11 μm. A portion of (fine particle dispersion W1) was dried to isolate the resin component. Tg of the resin component measured by DSC measurement was 71° C.: initial softening temperature was 105° C.: and flow temperature was 169° C.

Production Example 2

Production of Water-Based Dispersion of Resin Particles (A)

A reaction container equipped with a stirring rod and a thermometer was loaded with 132 parts of isopropanol, and a mixed solution containing 55 parts of styrene, 110 parts of methacrylic acid, 110 parts of butyl acrylate, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W2). The volume average particle diameters of (fine particle dispersion W2) measured by LA-920 and ELS-800 were both 0.10 μm. A portion of (fine particle dispersion W2) was dried to isolate the resin component. Tg of the resin component measured by DSC measurement was 73° C.: initial softening temperature was 102° C.: and flow temperature was 178° C.

Production Example 3

Production of Water-Based Dispersion of Resin Particles (A)

A reaction container equipped with a stirring rod and a thermometer was loaded with 130 parts of isopropanol, and a mixed solution containing 31 parts of butyl acrylate, 214 parts of vinyl acetate, 61 parts of methacrylic acid, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W3). The volume average particle diameters of (fine particle dispersion W3) measured by LA-920 and ELS-800 were both 0.10 μm. A portion of (fine particle dispersion W3) was dried to isolate the resin component. Tg of the resin component measured by DSC measurement was 60° C.: initial softening temperature was 97° C.: and flow temperature was 159° C.

Production Example 4

Production of Water-Based Dispersion of Resin Particles (A)

A reaction container equipped with a stirring rod and a thermometer was loaded with 130 parts of isopropanol, and a mixed solution containing 31 parts of butyl acrylate, 153 parts of vinyl acetate, 122 parts of maleic anhydride, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W4). The volume average particle diameters of (fine particle dispersion W4) measured by LA-920 and ELS-800 were both 0.10 μm. A portion of (fine particle dispersion W4) was dried to isolate the resin component. Tg of the resin component measured by DSC measurement was 82° C.: initial softening temperature was 119° C.: and flow temperature was 189° C.

Production Example 5

Production of Water-Based Dispersion of Resin Particles (A)

A reaction container equipped with a stirring rod and a thermometer was loaded with 130 parts of isopropanol, and a mixed solution containing 31 parts of butyl acrylate, 214 parts of vinyl acetate, 61 parts of maleic anhydride, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W5). The volume average particle diameters of (fine particle dispersion W5) measured by LA-920 and ELS-800 were both 0.10 μm. A portion of (fine particle dispersion W5) was dried to isolate the resin component. Tg of the resin component measured by DSC measurement was 67° C.: initial softening temperature was 103° C.: and flow temperature was 171° C.

Production Example 6

Production of Water-Based Dispersion of Resin Particles (A)

A reaction container equipped with a stirring rod and a thermometer was loaded with 130 parts of isopropanol, and a mixed solution containing 31 parts of butyl acrylate, 153 parts of vinyl acetate, 122 parts of crotonic acid, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W6). The volume average particle diameters of (fine particle dispersion W6) measured by LA-920 and ELS-800 were both 0.10 μm. A portion of (fine particle dispersion W6) was dried to isolate the resin component. Tg of the resin component measured by DSC measurement was 70° C.: initial softening temperature was 104° C.: and flow temperature was 170° C.

Production Example 7

Production of Water-Based Dispersion of Resin Particles (A)

A reaction container equipped with a stirring rod and a thermometer was loaded with 130 parts of isopropanol, and a mixed solution containing 31 parts of butyl acrylate, 214 parts of vinyl acetate, 61 parts of crotonic acid, 8 parts of alkylallylsulfosuccinic acid sodium salt (Eleminol JS-2, manufactured by Sanyo Chemical Industries, Ltd.), and 60 parts of benzoyl peroxide (containing 25% water) was dropwise added in 120 minutes in stirring condition. Further, 50 parts of this polymerization solution was dropwise added to 60 parts of ion water in stirring condition to obtain a water-based dispersion (fine particle dispersion W7). The volume average particle diameters of (fine particle dispersion W7) measured by LA-920 and ELS-800 were both 0.10 μm. A portion of (fine particle dispersion W7) was dried to isolate the resin component. Tg of the resin component measured by DSC measurement was 61° C.: initial softening temperature was 99° C.: and flow temperature was 157° C.

Production Example 8

Production of Water-Based Dispersion of Resin Particles (A)

A reaction container equipped with a stirring rod and a thermometer was loaded with 753 parts of water, 8 parts of alkylallylsulfosuccinic acid sodium salt (Eleminol JS-2, manufactured by Sanyo Chemical Industries, Ltd.), 88 parts of vinyl acetate, 88 parts of methacrylic acid, 42 parts of butyl acrylate, 1 part of ammonium persulfate, and 9 parts of a surfactant (monooleic acid polyoxysorbitan), and the mixture was stirred at 400 rpm for 15 minutes to obtain a white emulsion. The emulsion was heated to increase the system temperature to 75° C. and reaction was carried out for 5 hours. Further, 30 parts of an aqueous 1% ammonium persulfate solution was added and aging was carried out at 75° C. for 5 hours to obtain a water-based dispersion (fine particle dispersion W8). The volume average particle diameters of (fine particle dispersion W8) measured by LA-920 and ELS-800 were both 0.10 μm. A portion of (fine particle dispersion W8) was dried to isolate the resin component. Tg of the resin component measured by DSC measurement was 65° C.: initial softening temperature was 109° C.: and flow temperature was 192° C.

Production Example 9

Production of Water-Based Dispersion of Resin Particles (A)

A reaction container equipped with a stirring rod and a thermometer was loaded with 753 parts of water, 8 parts of alkylallylsulfosuccinic acid sodium salt (Eleminol JS-2, manufactured by Sanyo Chemical Industries, Ltd.), 48 parts of styrene, 68 parts of methacrylic acid, 77 parts of butyl acrylate, 1 part of ammonium persulfate, and 9 parts of a surfactant (polyoxymonooleic acid polyoxysorbitan), and the mixture was stirred at 400 rpm for 15 minutes to obtain a white emulsion. The emulsion was heated to increase the system temperature to 75° C. and reaction was carried out for 5 hours. Further, 30 parts of an aqueous 1% ammonium persulfate solution was added and aging was carried out at 75° C. for 5 hours to obtain a water-based dispersion (fine particle dispersion W9). The volume average particle diameters of (fine particle dispersion W9) measured by LA-920 and ELS-800 were both 0.05 μm. A portion of (fine particle dispersion W9) was dried to isolate the resin component. Tg of the resin component measured by DSC measurement was 62° C.: initial softening temperature was 110° C.: and flow temperature was 198° C.

Production Example 10

Production of Water-Based Dispersion of Resin (b)

Synthesis of Linear Polyester

A reaction chamber equipped with a condenser tube, a stirrer, and a nitrogen introduction tube was loaded with 701 parts (18.8 mole) of 1,2-propylene glycol (hereinafter, 1,2-propylene glycol is referred to as propylene glycol), 716 parts (7.5 mole) of terephthalic acid dimethyl ester, 180 parts (2.5 mole) of adipic acid, and 3 parts of tetrabutoxy titanate as a condensation catalyst, and reaction was carried out at 180° C. for 8 hours under nitrogen current while produced methanol was removed by distillation. Next, the reaction mixture was gradually heated to 230° C., reaction was carried out for 4 hours under nitrogen current while produced propylene glycol and water were removed by distillation, and further reaction was carried out under a reduced pressure of 5 to 20 mmHg, and the reaction product was taken out when the softening point reached 150° C. The recovered propylene glycol was 316 parts (8.5 mole). After the obtained resin was cooled to room temperature, the resin was pulverized for granulation to obtain (polyester b1). Mn of (polyester b1) was 8000.

The number of moles in the parentheses means relative ratio by mole (hereinafter the same).

Production Example 11

Production of Water-Based Dispersion of Resin (b)

Synthesis of Non-Linear Polyester

A reaction chamber equipped with a condenser tube, a stirrer, and a nitrogen introduction tube was loaded with 557 parts (17.5 mole) of propylene glycol, 569 parts (7.0 mole) of terephthalic acid dimethyl ester, 184 parts (3.0 mole) of adipic acid, and 3 parts of tetrabutoxy titanate as a condensation catalyst, and reaction was carried out at 180° C. for 8 hours under nitrogen current while produced methanol was removed by distillation. Next, the reaction mixture was gradually heated to 230° C., reaction was carried out for 4 hours under nitrogen current while produced propylene glycol and water were removed by distillation, and further reaction was carried out for 1 hour under a reduced pressure of 5 to 20 mmHg. The recovered propylene glycol was 175 parts (5.5 mole). After the obtained resin was cooled to 180° C. and 121 parts (1.5 mole) of trimellitic anhydride was added, reaction was carried out 2 hours at normal pressure and closed state. Thereafter, reaction was carried out at 220° C. and normal pressure, the reaction product was taken out when the softening point reached 180° C., cooled to room temperature and successively pulverized for granulation to obtain (polyester b2). Mn of (polyester b2) was 8500.

Production Example 12

A reaction container equipped with a stirring rod and a thermometer was loaded with 2000 parts of polycaprolactone diol (Placcel L220AL, manufactured by Daicel Chemical Industry, Ltd.) having a hydroxyl value of 56 and heated to 110° C., and dehydration was carried out for 1 hour at a reduced pressure of 3 mmHg. Successively, 457 parts of IPDI was loaded and reaction was carried out at 110° C. for 10 hours to obtain (urethane prepolymer 1) having isocyanate group at terminals. The NCO content of (urethane prepolymer 1) was 3.6%.

Production Example 13

A reaction container equipped with a stirring rod and a thermometer was loaded with 50 parts of ethylene diamine and 300 parts of MIBK, and reaction was carried out at 50° C. for 5 hours to obtain (curing agent 1) which is a ketimine compound.

Production Example 14

Production of Resin (b)

An autoclave reaction chamber equipped with a thermometer, a stirrer, and a nitrogen introduction tube was loaded with 452 parts of xylene, and after replacement of the air with nitrogen, a monomer mixture containing 845 parts of styrene and 155 parts of n-butyl acrylate, and a mixture containing 6.4 parts of di-tert-butyl peroxide as an initiator and 125 parts of xylene were dropwise added at 170° C. in 3 hours. On completion of the dropwise addition, the reaction system was aged at 170° C. for 1 hour to complete the polymerization. After that, desolvation was carried out at a reduced pressure to obtain a resin (vinyl type resin b3). The weight average molecular weight of (vinyl type resin b3) by GPC was 14,000 and Tg was 60° C.

Production Example 15

Production of Resin (b)

A reaction container equipped with a condenser tube, a stirrer, and a nitrogen introduction tube was loaded with 343 parts of bisphenol A-EO 2 mole adduct, 166 parts of isophthalic acid, and 2 parts of dibutyltinoxide, reaction was carried out at 230° C. for 8 hours under normal pressure, and further reaction was carried out at a reduced pressure of 10 to 15 mmHg for 5 hours. Thereafter, the reaction system was cooled to 110° C., 17 parts of isophorone diisocyanate in toluene was added, reaction was carried out at 110° C. for 5 hours, and successively desolvation was carried out to obtain (urethane-modified polyester b4) with weight average molecular weight of 72,000 and NCO content of 0.7%.

Production Example 16

Production of Resin (b)

In the same manner as Production Example 13, (polyester b5) which was not modified and had Mn 2,400, hydroxyl value of 51 and acid value of 5 was obtained by polycondensation of 570 parts of bisphenol A-EO 2 mole adduct and 217 parts of terephthalic acid at 230° C. for 6 hours under normal pressure.

Production Example 17

Production of Coloring Agent Dispersion

After 20 parts of copper phthalocyanine, 4 parts of a coloring agent dispersant (Solsperse 28000; manufactured by Avecia Co., Ltd.), 20 parts of (polyester b2) and 56 parts of ethyl acetate were put in a beaker, stirred, and evenly dispersed, the copper phthalocyanine was finely dispersed by a bead mill to obtain (coloring agent dispersion 1). The volume average particle diameter of (coloring agent dispersion 1) measured by LA-920 was 0.3 μm.

Production Example 18

Production of Modified Wax

An autoclave reaction chamber equipped with a thermometer and a stirrer was loaded with 454 parts of xylene and 150 parts of low molecular weight polyethylene (Sunwax LEL-400, manufactured by Sanyo Chemical Industries, Ltd.: softening point 128° C.), after replacement of the air with nitrogen, the mixture was sufficiently dissolved by heating to 170° C., a mixed solution containing 595 parts of styrene, 255 parts of methyl methacrylate, 34 parts of di-tert-butyl peroxyhexahydroterephthalate, and 119 parts of xylene was dropwise added at 170° C. in 3 hours, polymerization was carried out, and further the polymerization product was kept at that temperature for 30 minutes. After that, desolvation was carried out to obtain (modified wax 1). The sp value of the grafted chain of (modified wax 1) was 10.35 $(cal/cm^3)^{1/2}$: Mn was 1872: Mw was 5194: and Tg was 56.9° C.

Production Example 19

Production of Wax Dispersion

A reaction container equipped with a thermometer and a stirrer was loaded with 10 parts of paraffin wax (melting point 73° C.), 1 part of (modified was 1), and 33 parts of ethyl acetate, the mixture was heated to 78° C. and sufficiently dissolved, and the mixture was then cooled to 30° C. in 1 hour to precipitate wax in finely granular state and further wet pulverized by an Ultraviscomill (manufactured by Aimex) to obtain (wax dispersion 1).

Production Example 20

Production of Resin Solution

A reaction container equipped with a thermometer and a stirrer was loaded with 10 parts of (polyester b1) and 10 parts of ethyl acetate, stirred and evenly dispersed to obtain (resin solution 1).

Production Example 21

Production of Resin Solution

A reaction container equipped with a thermometer and a stirrer was loaded with 10 parts of (polyester b2) and 10 parts of ethyl acetate, stirred and evenly dispersed to obtain (resin solution 2).

Production Example 22

Production Of Resin Solution

A reaction container equipped with a thermometer and a stirrer was loaded with 10 parts of (vinyl type resin b3) and 10 parts of ethyl acetate, stirred and evenly dispersed to obtain (resin solution 3).

Production Example 23

Production of Resin Solution

Two hundred (200) parts of (urethane-modified polyester b4) and 800 parts of (polyester b5) were dissolved in 1,800 parts of ethyl acetate and stirred to obtain (resin solution 4). A portion of (resin solution 4) was dried at reduced pressure to isolate a resin component. Tg of the resin component measured by DSC measurement was 55° C.

Example 1

Forty eight (48) parts of (resin solution 1), 12 parts of (resin solution 2), 27 parts of (wax dispersion 1), and 10 parts of (coloring agent dispersion 1) were put in a beaker, stirred at 25° C. and 8,000 rpm by TK Homomixer, evenly dissolved, and dispersed to obtain (resin solution 1A).

Ninety seven (97) parts of ion exchanged water, 15.4 parts of (fine particle dispersion W1), 1 part of carboxymethyl cellulose sodium, and 10 parts of a 48.5% aqueous solution of sodium dodecyl diphenyl ether disulfonate (Eleminol MON-7, manufactured by Sanyo Chemical Industries, Ltd.) were put in a beaker and evenly dissolved. Next, at 25° C., in stirring condition at 10,000 rpm by TK Homomixer, 75 parts of (resin solution 1A) was loaded and stirred for 2 minutes. Successively, the resulting mixture liquid was transferred to a flask equipped with a stirring rod and a thermometer and heated to 35° C., until the concentration became 0.5% or lower, ethyl acetate was removed by distillation to obtain water-based resin dispersion (XF1) of resin particles bearing film formed from resin particles derived from (fine particle dispersion W1) deposited on the surfaces. Next, after 100 parts of a 5% aqueous sodium hydroxide was added to 100 parts of (XF1) and mixed at a temperature of 40° C. and a rotating speed of 12,000 rpm for 10 minutes by TK Homomixer (manufactured by Tokushu Kika Kogyo Co., Ltd.) to dissolve the fine particles derived from (fine particle dispersion W1) deposited on the surfaces, the dispersion was filtered and drying was carried out at 40° C. for 18 hours to obtain resin particles (F1) with 0.5% or less volatile matter.

Example 2

Forty eight (48) parts of (resin solution 1), 6 parts of (urethane polymer 1), 0.2 parts of (curing agent 1), 27 parts of (wax dispersion 1), and 10 parts of (coloring agent dispersion 1) were put in a beaker and stirred at 25° C. and 8,000 rpm by TK Homomixer, and evenly dissolved and dispersed to obtain (resin solution 1B).

Ninety seven (97) parts of ion exchanged water, 10.5 parts of (fine particle dispersion W1), 1 part of carboxymethyl cellulose sodium, and 10 parts of a 48.5% aqueous solution of sodium dodecyl diphenyl ether disulfonate (Eleminol MON-7, manufactured by Sanyo Chemical Industries, Ltd.) were put in a beaker and evenly dissolved. Next, at 25° C., in stirring condition at 10,000 rpm by TK Homomixer, 75 parts of (resin solution 1B) was loaded and stirred for 2 minutes. Successively, the resulting mixture liquid was transferred to a flask equipped with a stirring rod and a thermometer and heated to 35° C., until the concentration became 0.5% or lower, ethyl acetate was removed by distillation to obtain water-based resin dispersion (XF2) of resin particles bearing film formed from resin particles derived from (fine particle dispersion W1) deposited on the surfaces. Next, after 100 parts of a 5% aqueous sodium hydroxide was added to 100 parts of (XF2) and mixed at a temperature of 40° C. and a rotating speed of 12,000 rpm for 10 minutes by TK Homomixer (manufactured by Tokushu Kika Kogyo Co., Ltd.) to dissolve the fine particles derived from (fine particle dispersion W1) deposited on the surfaces, the dispersion was filtered and drying was carried out at 40° C. for 18 hours to obtain resin particles (F2) with 0.5% or less volatile matter.

Example 3

Sixty (60) parts of (resin solution 3), 27 parts of (wax dispersion 1), and 10 parts of (coloring agent dispersion) were put in a beaker, stirred at 25° C. and 8,000 rpm by TK Homomixer, and evenly dissolved and dispersed to obtain (resin solution 3A).

Ninety seven (97) parts of ion exchanged water, 10.5 parts of (fine particle dispersion W1), 1 part of carboxymethyl cellulose sodium, and 10 parts of a 48.5% aqueous solution sodium dodecyl diphenyl ether disulfonate (Eleminol MON-7, manufactured by Sanyo Chemical Industries, Ltd.) were put in a beaker and evenly dissolved. Next, at 25° C., in stirring condition at 10,000 rpm by TK Homomixer, 75 parts of (resin solution 3A) was loaded and stirred for 2 minutes. Successively, the resulting mixture liquid was transferred to a flask equipped with a stirring rod and a thermometer, and heated to 35° C., until the concentration became 0.5% or lower, ethyl acetate was removed by distillation to obtain water-based resin dispersion (XF3) of resin particles bearing film formed from resin particles derived from (fine particle dispersion W1) deposited on the surfaces. Next, after 100 parts of a 5% aqueous sodium hydroxide was added to 100 parts of (XF3) and mixed at a temperature of 40° C. and a rotating speed of 12,000 rpm for 10 minutes by TK Homomixer (manufactured by Tokushu Kika Kogyo Co., Ltd.) to dissolve the fine particles derived from (fine particle dispersion W1) deposited on the surfaces, the dispersion was filtered and drying was carried out at 40° C. for 18 hours to obtain resin particles (F3) with 0.5% or less volatile matter.

Example 4

Resin particles (F4) bearing a small amount of resin particles formed into film form and which particles were derived from (fine particle dispersion W2) were obtained in the same manner as Example 1, except that (fine particle dispersion W1) was changed to (fine particle dispersion W2).

Example 5

Resin particles (F5) bearing a small amount of resin particles formed into film form and which particles were derived from (fine particle dispersion W3) were obtained in the same manner as Example 1, except that (fine particle dispersion W1) was changed to (fine particle dispersion W3).

Example 6

Resin particles (F6) bearing a small amount of resin particles formed into film form and which particles were derived from (fine particle dispersion W4) were obtained in the same manner as Example 1, except that (fine particle dispersion W1) was changed to (fine particle dispersion W4).

Example 7

Resin particles (F7) bearing a small amount of resin particles formed into film form and which particles were derived from (fine particle dispersion W5) were obtained in the same manner as Example 1, except that (fine particle dispersion W1) was changed to (fine particle dispersion W5).

Example 8

Resin particles (F8) bearing a small amount of resin particles formed into film form and which particles were derived from (fine particle dispersion W6) were obtained in the same manner as Example 1, except that (fine particle dispersion W1) was changed to (fine particle dispersion W6).

Example 9

Resin particles (F9) bearing a small amount of resin particles formed into film form and which particles were derived from (fine particle dispersion W7) were obtained in the same manner as Example 1, except that (fine particle dispersion W1) was changed to (fine particle dispersion W7).

Comparative Example 1

Resin particles (F'1) bearing a small amount of resin particles derived from (fine particle dispersion W8) were obtained in the same manner as Example 1, except that (fine particle dispersion W1) was changed to (fine particle dispersion W8).

Comparative Example 2

Resin particles (F' 2) bearing a small amount of resin particles derived from (fine particle dispersion W9) were obtained in the same manner as Example 1, except that (fine particle dispersion W1) was changed to (fine particle dispersion W9).

Comparative Example 3

Resin particles (F' 3) bearing a small amount of resin particles formed into film form and which particles were derived from (fine particle dispersion W1) were obtained in the same manner as Example 1, except that the 5% aqueous sodium hydroxide was changed to a 0.5% aqueous sodium hydroxide.

Comparative Example 4

Resin particles (F' 4) bearing a small amount of resin particles formed into film form and which particles were derived from (fine particle dispersion W1) were obtained in the same manner as Example 1, except that the 5% aqueous sodium hydroxide was changed to a 30% aqueous sodium hydroxide.
Physical Property Measurement Examples Resin particles (F1) to (F9) and (F'1) to (F'4) obtained in Examples 1 to 9 and Comparative Examples 1 to 4 were dispersed in water and the particle size distributions were measured by Coulter counter. The average degree of circularity and low temperature fixing property of the resin particles were measured. The results are shown in Table 1.

TABLE 1

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| type of resin particles | F1 | F2 | F3 | F4 | F5 | F6 | F7 | F8 | F9 | F'1 | F'2 | F'3 | F'4 |
| glass transition temperature of (a) (° C.) | 71 | 71 | 71 | 73 | 60 | 82 | 67 | 70 | 61 | 65 | 62 | 71 | 71 |
| initial softening temperature of (a) (° C.) | 105 | 105 | 105 | 102 | 97 | 119 | 103 | 104 | 99 | 109 | 110 | 105 | 105 |
| flow temperature of (a) (° C.) | 169 | 169 | 169 | 178 | 159 | 189 | 171 | 170 | 157 | 192 | 198 | 169 | 169 |
| difference of glass transition temperature and flow temperature of (a) (° C.) | 98 | 98 | 98 | 105 | 99 | 108 | 104 | 100 | 96 | 127 | 136 | 98 | 98 |
| carboxyl group content of (a) (%) | 20.3 | 20.3 | 20.3 | 20.3 | 10.0 | 29.6 | 19.8 | 20.3 | 10.2 | 24.3 | 19.9 | 20.3 | 20.3 |

TABLE 1-continued

|  | Example | | | | | | | | | Comparative Example | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| sulfonic acid group content of (a) (%) | 0.5 | 0.5 | 0.5 | 0.5 | 0.5 | 0.5 | 0.5 | 0.5 | 0.5 | 0.8 | 0.8 | 0.5 | 0.5 |
| volume average particle diameter of (A) (μm) | 0.11 | 0.11 | 0.11 | 0.10 | 0.10 | 0.10 | 0.10 | 0.10 | 0.10 | 0.10 | 0.05 | 0.11 | 0.11 |
| volume average particle diameter of (D) (μm) | 5.7 | 5.7 | 5.7 | 5.9 | 5.7 | 5.7 | 5.4 | 5.6 | 5.4 | 5.9 | 5.4 | 5.5 | 5.6 |
| (volume average particle diameter/number average particle diameter) of (D) | 1.17 | 1.16 | 1.18 | 1.18 | 1.16 | 1.17 | 1.18 | 1.16 | 1.15 | 1.17 | 1.17 | 1.16 | 1.17 |
| Surface coverage (%) | 0.3 | 0.3 | 0.3 | 0.4 | 0.6 | 0.4 | 0.4 | 0.4 | 0.4 | 0.3 | 0.3 | 5.7 | 0.02 |
| Average degree of circularity of (D) | 0.98 | 0.98 | 0.98 | 0.98 | 0.98 | 0.98 | 0.98 | 0.98 | 0.98 | 0.98 | 0.98 | 0.96 | 0.96 |
| particle surface smoothness of (D) | ⊚ | ⊚ | ⊚ | ⊚ | ⊚ | ⊚ | ⊚ | ⊚ | ⊚ | ⊚ | ⊚ | X | Δ |
| electrostatic charge quantity (μC/g) | −23 | −24 | −24 | −24 | −24 | −26 | −24 | −25 | −25 | −21 | −21 | −20 | −15 |
| low temperature fixing (° C.) | 105 | 105 | 105 | 105 | 105 | 115 | 110 | 105 | 105 | 135 | 135 | 110 | 110 |
| thermal resistant storage stability | ○ | ○ | ○ | ○ | ○ | ○ | ○ | ○ | ○ | ○ | ○ | ○ | ○ |

The measurement of the average degree of circularity was according to the method as described above.

The measurement of the surface coverage was according to the method as described above.

The measurement methods of the electrostatic property, thermal resistant storage stability, low temperature fixing property, and surface smoothness were as follows.

Electrostatic Property (Electrostatic Charge Quantity)

A ground stopper glass bottle with 50 cc capacity was loaded with accurately weighed 0.5 g of resin particles and 10 g of iron powder (F-150, manufactured by Nippon Iron Powder Corporation Ltd.), plugged and set in a Tumbler Shaker Mixer (manufactured by Willy A Bassophen) in 50% RH atmosphere at 23° C., and the mixture was stirred at 90 rpm for 2 minutes. After stirred, 0.2 g of the mixed powder was packed in a blow off powder electric charge measurement apparatus in which a stainless net with 20 μm clearance (TB-203, manufactured by KYOCERA Corporation) is set, the electrostatic charge quantity of the remaining iron powder was measured in condition of blow pressure of 10 KPa and suction pressure of 5 KPa, and the electrostatic charge quantity of the resin particles was calculated by a standardized method. As the minus electrostatic charge quantity is higher, the electrostatic property is better for a toner.

Thermal Resistant Storage Stability

Resin particles were kept still in a dryer adjusted at 50° C. for 15 hours, depending on the extent of blocking, the thermal resistant storage stability was evaluated in accordance with the following standard.

○: no blocking occurred.

Δ: although blocking occurred, particles were easily dispersed if power was applied.

x: blocking occurred and particles were not dispersed even if power was applied.

Low Temperature Fixing Property

After 1.0% of Aerosil R 972 (manufactured by Nippon Aerosil Co., Ltd.) was added to resin particles and mixed well and evenly, the obtained powder was set at a weight density of 0.6 mg/cm² on a paper (a method for putting the powder on a paper was carried out using a printer from which a heat fixing unit was disassembled, however, another method could be employed if the powder could be put evenly with the above-mentioned weight density). When the paper was passed on a pressure roller at a fixing speed (heat roller circumferential speed) 213 mm/sec and fixing pressure (pressure applied by pressure roller) 10 kg/cm², the temperature at which cold offset occurred was measured.

Surface Smoothness

The surface smoothness was evaluated using a photograph of resin particles (D) at a magnification ratio of 10,000 to 30,000 times by a scanning electron microscope (SEM).

⊚: surface was completely free from unevenness and very smooth.

○: although partially uneven parts were observed in the surface, as a whole the surface was almost free from unevenness and smooth.

Δ: although unevenness was observed in the surface as a whole, no particulate substance derived from resin (a) was confirmed.

x: unevenness was considerably noticeable in the surface as a whole and particulate substance derived from resin (a) was confirmed.

INDUSTRIAL APPLICABILITY

The resin particles of the invention have a uniform particle diameter and excellent in thermal properties and electrostatic properties, thermal resistant storage stability, so that the resin particles are remarkably useful for resins for slush molding, powder coatings, spacers for electronic parts such as liquid crystals, standard particles for electronic measurement instruments, toners used for electrophotography, electrostatic recording and electrostatic printing, various types of hot melt adhesives, and resin particles for other molding materials.

The invention claimed is:

1. Resin particles (D) having a structure formed by (i) depositing resin particles (A) comprising a first resin (a) having an initial softening temperature of 40 to 270° C., a glass transition temperature of 20 to 250° C., a flow temperature of 60 to 300° C., and difference of the glass transition temperature and the flow temperature in a range of 0 to 120° C., on the surfaces of resin particles (B) comprising a second resin (b) or (ii) depositing a film (P) comprising the resin (a) on the surfaces of resin particles (B) comprising a second resin (b); wherein the surface coverage of the resin particles (B) with the resin particles (A) or the film (P) is 0.1 to 4.9%, whereby the surface coverage is calculated by image analysis of an image obtained by scanning electron microscope of the resin particles according to the following equation:

Surface coverage (%)=(surface area of portions covered with resin particles (A) or film (P)/(surface area of portion covered with resin particles (A) or film (P)+surface area of exposed portions of resin particles (B))×100.

2. The resin particles according to claim 1, wherein the resin (a) and/or resin (b) is at least one resin selected from vinyl resins, polyester resins, polyurethane resins, and epoxy resins.

3. The resin particles according to claim 1, wherein (a) contains 1 to 50% by weight of carboxyl groups, at least some of which may be neutralized with a basic group.

4. The resin particles according to claim 1, wherein (a) contains sulfonic acid anion group ($-SO_3^-$)in an amount of 0.001 to 10% by weight based on the weight of (a).

5. The resin particles according to claim 1, wherein (B) comprises the resin (b), a wax (c), and a modified wax (d) grafted with a vinyl polymer chain.

6. The resin particles according to claim 1 for resins for slush molding, powder coatings, spacers for electronic parts production, standard particles for electronic measurement instruments, electrophotographic toners, electrostatic recording toners, electrostatic printing toners, or hot melt adhesives.

7. The resin particles according to claim 1 obtained by:
mixing (i) a water-based dispersion (W) of resin particles (A) comprising the resin (a) with (ii) the second resin (b), a solvent solution of the second resin (b) (O1), a precursor (b0) of the resin (b), or a solvent solution of the precursor (b0) of the resin (b) (O2), and dispersing (O1) or (O2) in (W), and
in the case of using (b0) or a solvent solution thereof, further causing reaction of the precursor and thereby forming resin particles (B) of (b) in (W);
obtaining a water-based dispersion of resin particles (C) having a structure formed by depositing the resin particles (A) or the film (P) comprising the resin (a) on the surfaces of the resin particles (B);
obtaining a water-based dispersion of resin particles (D) by removing a portion of the resin particles (A) or the film (P) on the surfaces of (C) by separation and/or dissolution; and
removing the aqueous medium from the water-based dispersion.

8. A method for producing resin particles by mixing (i) a water-based dispersion (W) of resin particles (A) comprising a first resin (a) having an initial softening temperature of 40 to 270° C., a glass transition temperature of 20 to 250° C., a flow temperature of 60 to 300° C., and difference of the glass transition temperature and the flow temperature in a range of 0 to 120° C., with (ii) a second resin (b), a solvent solution of the second resin (b) (O1), a precursor (b0) of the resin (b) or a solvent solution of the precursor (b0) of the resin (b) (O2) and dispersing (O1) or (O2) in (W),
further causing reaction of the precursor in the case of using (b0) or a solvent solution thereof and thereby forming resin particles (B) comprising (b) in (W);
obtaining a water-based dispersion of resin particles (C) having a structure formed by depositing the resin particles (A) or a film (P) comprising the resin (a) on the surface of the resin particles (B);
obtaining a water-based dispersion of resin particles (D) by removing a portion of the resin particles (A) or the film (P) on the surfaces of (C) by separation and/or dissolution; and
removing the aqueous medium from the water-based dispersion.

9. The resin particles according to claim 2, wherein (a) contains 1 to 50% by weight of carboxyl groups, at least some of which may be neutralized with a basic group.

10. The resin particles according to claim 2, wherein (a) contains sulfonic acid anion group ($-SO_3^-$) in an amount of 0.001 to 10% by weight based on the weight of (a).

11. The resin particles according to claim 3, wherein (a) contains sulfonic acid anion group ($-SO_3^-$) in an amount of 0.001 to 10% by weight based on the weight of (a).

12. The resin particles according to claim 2, wherein (B) comprises the resin (b), a wax (c), and a modified wax (d) grafted with a vinyl polymer chain.

13. The resin particles according to claim 3, wherein (B) comprises the resin (b), a wax (c), and a modified wax (d) grafted with a vinyl polymer chain.

14. The resin particles according to claim 4, wherein (B) comprises the resin (b), a wax (c), and a modified wax (d) grafted with a vinyl polymer chain.

15. The resin particles according to claim 11, wherein (B) comprises the resin (b), a wax (c), and a modified wax (d) grafted with a vinyl polymer chain.

16. The resin particles according to claim 3 obtained by mixing (i) a water-based dispersion (W) of resin particles (A) comprising the resin (a) with (ii) the second resin (b) or a solvent solution thereof (O1), or a precursor (b0) of the resin (b) or a solvent solution thereof (O2), and dispersing (O1) or (O2) in (W), and in the case of using the precursor or a solvent solution thereof, further causing reaction of (b0) and thereby forming resin particles (B) of (b) in (W);
obtaining a water-based dispersion of resin particles (C) having a structure formed by depositing the resin particles (A) or the film (P) comprising the resin (a) on the surfaces of the resin particles (B);
obtaining a water-based dispersion of resin particles (D) by removing a portion of the resin particles (A) or the film (P) on the surfaces of (C) by separation and/or dissolution; and removing the aqueous medium from the water-based dispersion.

17. The resin particles according to claim 4 obtained by mixing (i) a water-based dispersion (W) of resin particles (A) comprising the resin (a) with (ii) the second resin (b) or a solvent solution thereof (O1), a precursor (b0) of the resin (b) or a solvent solution thereof (O2), and dispersing (O1) or (O2) in (W), and in the case of using (b0) or its solvent solution, further causing reaction of (b0) and thereby forming resin particles (B) of (b) in (W);
obtaining a water-based dispersion of resin particles (C) having a structure formed by depositing the resin particles (A) or the film (P) comprising the resin (a) on the surfaces of the resin particles (B);
obtaining a water-based dispersion of resin particles (D) by removing a portion of the resin particles (A) or the film (P) on the surfaces of (C) by separation and/or dissolution; and
removing the aqueous medium from the water-based dispersion.

18. The resin particles according to claim 11 obtained by mixing (i) a water-based dispersion (W) of resin particles (A) comprising the resin (a) with (ii) the second resin (b) or a solvent solution thereof (O1), a precursor (b0) of the resin (b) or a solvent solution thereof (O2), and dispersing (O1) or (O2) in (W), and in the case of using (b0) or its solvent solution, further causing reaction of (b0) and thereby forming resin particles (B) of (b) in (W);

obtaining a water-based dispersion of resin particles (C) having a structure formed by depositing the resin particles (A) or the film (P) comprising the resin (a) on the surfaces of the resin particles (B);

obtaining a water-based dispersion of resin particles (D) by removing a portion of the resin particles (A) or the film (P) on the surfaces of (C) by separation and/or dissolution; and removing the aqueous medium from the water-based dispersion.

* * * * *